US012676995B2

(12) United States Patent
Solovyev et al.

(10) Patent No.: US 12,676,995 B2
(45) Date of Patent: Jul. 7, 2026

(54) NEURAL NETWORK WITH APPROXIMATED ACTIVATION FUNCTION

(71) Applicant: HUAWEI TECHNOLOGIES CO., LTD., Shenzhen (CN)

(72) Inventors: Timofey Mikhailovich Solovyev, Munich (DE); Esin Koyuncu, Munich (DE); Alexander Alexandrovich Karabutov, Munich (DE); Maxim Borisovitch Sychev, Moscow (RU); Mikhail Vyacheslavovich Sosulnikov, Moscow (RU); Sergey Yurievich Ikonin, Moscow (RU); Elena Alexandrovna Alshina, Munich (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 12 days.

(21) Appl. No.: 18/884,321

(22) Filed: Sep. 13, 2024

(65) Prior Publication Data

US 2025/0008128 A1     Jan. 2, 2025

Related U.S. Application Data

(63) Continuation of application No. PCT/RU2022/000077, filed on Mar. 14, 2022.

(51) Int. Cl.
*H04N 19/189*     (2014.01)
*H04N 19/13*     (2014.01)
*H04N 19/42*     (2014.01)

(52) U.S. Cl.
CPC ........... *H04N 19/189* (2014.11); *H04N 19/13* (2014.11); *H04N 19/42* (2014.11)

(58) Field of Classification Search
CPC .... G06N 3/0455; G06N 3/0464; G06N 3/047; G06N 3/048; G06N 3/0495; H04N 19/00;
(Continued)

(56) References Cited

U.S. PATENT DOCUMENTS

| | | |
|---|---|---|
| 2019/0042922 A1 | 2/2019 | Pillai et al. |
| 2021/0358180 A1* | 11/2021 | Johnston ................. G06T 9/002 |
| 2021/0406649 A1 | 12/2021 | Zhang et al. |

FOREIGN PATENT DOCUMENTS

| | | |
|---|---|---|
| JP | 2019046460 A | 3/2019 |
| JP | 2020004398 A | 1/2020 |

(Continued)

OTHER PUBLICATIONS

Kim et al., "I-BERT: Integer-Only BERT Quantization," Cornell University Library, 201 Olin Library Cornell University, Ithaca, NY 14853, arXiv: 2101.01321v3, XP081978445, total 15 pages (Jun. 8, 2021).*

(Continued)

*Primary Examiner* — Shahan Ur Rahaman
(74) *Attorney, Agent, or Firm* — Leydig, Voit & Mayer, Ltd.

(57) ABSTRACT

A neural network including at least one neural network layer and an activation function connected to an output of the at least one neural network layer. The activation function is implemented as an approximation function of a mathematically defined real valued non-linear activation function, wherein the approximation function allows for integer-only processing of fixed-point representations of input values of the approximation function.

16 Claims, 20 Drawing Sheets

(58) Field of Classification Search

CPC .... H04N 19/124; H04N 19/13; H04N 19/189; H04N 19/42

See application file for complete search history.

(56) References Cited

FOREIGN PATENT DOCUMENTS

| | | |
|---|---|---|
| JP | 2020522032 A | 7/2020 |
| JP | 2022515711 A | 2/2022 |

OTHER PUBLICATIONS

Keller et al., "Effectiveness of MPC-friendly Softmax Replacement," arxiv.org, Cornell University Library, 201 Olin Library Cornell University Ithaca, NY 14853, XP091001524, total 6 pages (Jul. 6, 2021).*

Yao et al., "HAWQ-V3: Dyadic Neural Network Quantization," Cornell University Library, 201 Olin Library Cornell University, Ithaca, NY 14853, arXiv: 2011.10680v3, XP081977084, total 17 pages (Jun. 23, 2021).*

Ballé et al., "Variational Image Compression with a Scale Hyperprior," Published as a Conference Paper at ICLR 2018, total 47 pages (2018).

Minnen et al., "Joint Autoregressive and Hierarchical Priors for Learned Image Compression," Proceedings of the 32nd Conference on Neural Information Processing Systems, total 10 pages (2018).

Cheng et al., "Learned Image Compression with Discretized Gaussian Mixture Likelihoods and Attention Modules," Proceedings of the IEEE/CVF Conference on Computer Vision and Pattern Recognition, arXiv: 2001.01568v3, total 15 pages (Mar. 30, 2020).

Ballé et al., "Density Modeling of Images using a Generalized Normalization Transformation," arXiv: 1511.06281v4 [cs.LG], Published as a conference paper at ICLR 2016, total 14 pages (Feb. 29, 2016).

Lu et al., "DVC: An End-to-end Deep Video Compression Framework," arXiv: 1812.00101v3 [eess.IV], Proceedings of the IEEE/CVF Conference on Computer Vision and Pattern Recognition (CVPR), total 14 pages, Institute of Electrical and Electronics Engineers, New York, New York (Apr. 7, 2019).

Hesamifard et al., "Deep Neural Networks Classification over Encrypted Data," Proceedings of the Ninth ACM Conference on Data and Application Security and Privacy, XP055821223, total 12 pages (Mar. 25-27, 2019).

* cited by examiner

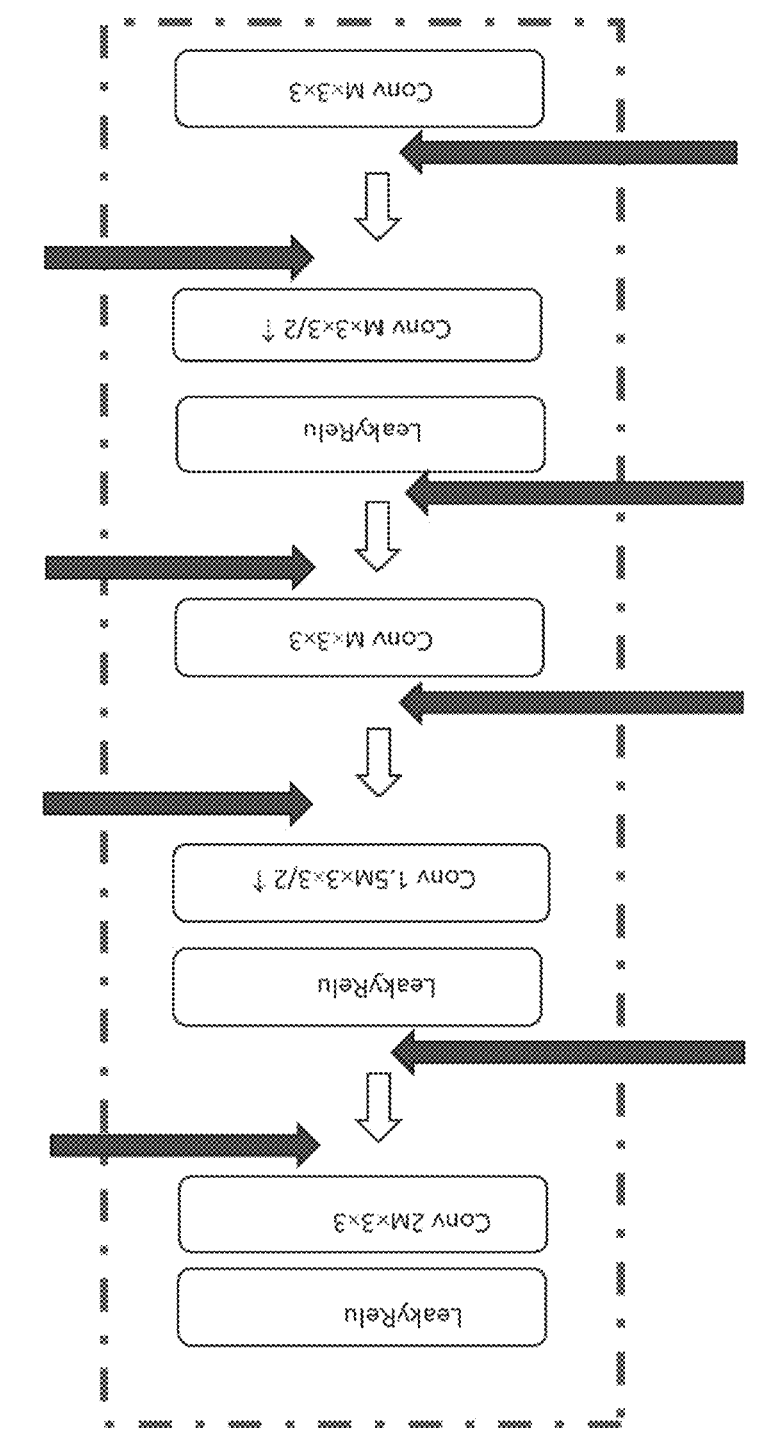

The following steps are added before each layer:
1. Multiplying input values to scaling factor
2. Rounding $\tilde{x}_i$ to nearest integer value
3. Clippings to specific ranges $-A \leq x_i \leq B$ The following steps are added after each layer:
1. Division result of convolution by scaling factors Conv M×3×3

Conv M×3×3/2 ↑

LeakyRelu

Conv M×3×3

Conv 1.5M×3×3/2 ↑

LeakyRelu

Conv 2M×3×3

LeakyRelu

S1210 defining integer upper and lower thresholds

S1220 clipping of integer valued input data based on the defined integer upper and lower thresholds

S1230 determining integer valued weights such that integer overflow of an accumulator register can be avoided

Figure 13:
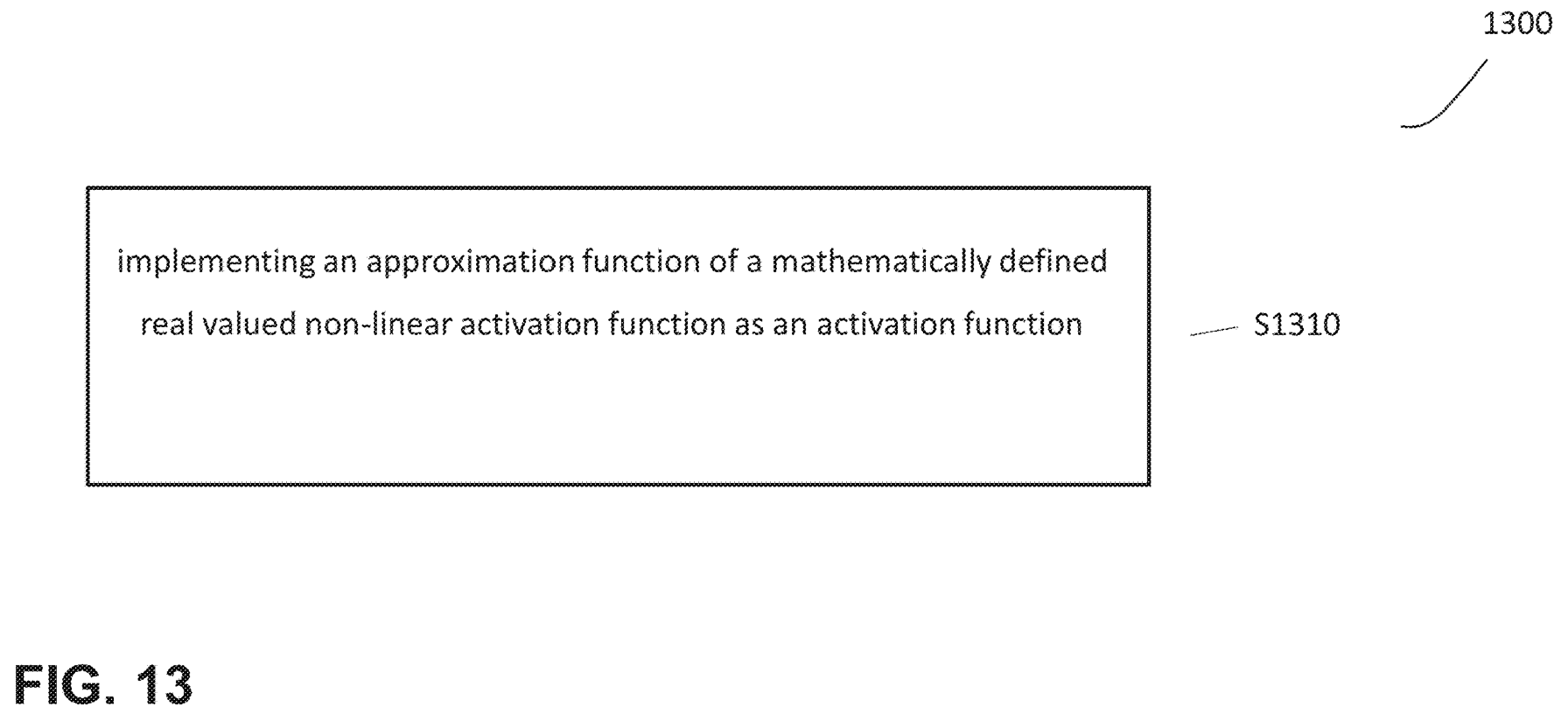

1300

S1310 implementing an approximation function of a mathematically defined real valued non-linear activation function as an activation function

FIG. 13 neural network
1400

1410
neural network layer 1420
approximated activation functions

NEURAL NETWORK WITH APPROXIMATED ACTIVATION FUNCTION

CROSS-REFERENCE TO RELATED APPLICATIONS

This application is a continuation of International Application No. PCT/RU2022/000077, filed on Mar. 14, 2022, the disclosure of which is hereby incorporated by reference in its entirety.

FIELD

Embodiments of the present disclosure generally relate to the field of encoding and decoding databased on a neural network architecture. The present disclosure includes methods and apparatuses for such encoding and decoding images and/or videos from a bitstream using a plurality of processing layers.

BACKGROUND

Hybrid image and video codecs have been used for decades to compress image and video data. In such codecs, a signal is typically encoded block-wisely by predicting a block and by further coding only the difference between the original bock and its prediction. In particular, such coding may include transformation, quantization and generating the bitstream, usually including some entropy coding. Typically, the three components of hybrid coding methods-transformation, quantization, and entropy coding—are separately optimized. Modern video compression standards like High-Efficiency Video Coding (HEVC), Versatile Video Coding (VVC) and Essential Video Coding (EVC) also use transformed representations to code a residual signal after prediction.

Recently, neural network architectures have been applied to image and/or video coding. In general, these neural network (NN) based approaches can be applied in various different ways to the image and video coding. For example, some end-to-end optimized image or video coding frameworks have been discussed. Moreover, deep learning has been used to determine or optimize some parts of the end-to-end coding framework such as selection or compression of prediction parameters or the like. Besides, some neural network based approaches have also been discussed for usage in hybrid image and video coding frameworks, e.g. for implementation as a trained deep learning model for intra or inter prediction in image or video coding.

The end-to-end optimized image or video coding applications discussed above have in common that they produce some feature map data, which is to be conveyed between encoder and decoder.

Neural networks are machine learning models that employ one or more layers of nonlinear units based on which they can predict an output for a received input. Some neural networks include one or more hidden layers in addition to an output layer. A corresponding feature map may be provided as an output of each hidden layer. Such corresponding feature map of each hidden layer may be used as an input to a subsequent layer in the network, i.e., a subsequent hidden layer or the output layer. Each layer of the network generates an output from a received input in accordance with current values of a respective set of parameters. In a neural network that is split between different devices, e.g. between encoder and decoder, or a device and a cloud, a feature map at the output of the site of splitting (e.g. a first device) is compressed and transmitted to the remaining layers of the neural network (e.g. to a second device).

Further improvement of encoding and decoding using trained network architectures may be desirable.

SUMMARY

The present disclosure provides methods and apparatuses to improve the device interoperability of devices/platforms of different architectures comprising neural networks. By device interoperability it is meant that running the same procedure with the same input data on two devices/platforms gives the same results for both devices/platforms. Particularly, in the context of entropy model based coding and/or compressing and decompressing of data, for example, image data, it is a crucial issue to provide for substantially bitexact processing results on an encoding and decoding side, respectively, in order to provide for the same or complementary technical effects.

In order to guarantee device interoperability of an entire neural network bitexact reproducibility of activation functions on different platforms/devices is desirable. For linear and relatively simple non-linear activation functions like, for example, a rectified linear activation (ReLU) function that basically defines a clipping procedure this requirement can be relatively easily fulfilled. For more complicated non-linearities, particularly, those including exponential functions, like Softmax $$(x)_i = \frac{e^{x_i}}{\sum_{j=1}^{K} e^{x_j}},$$

calculation results can be different on different platforms. This is because the respective precision of the exponent calculation can be different and even if the input is integer value (number) and the output is rounded to integer values (numbers), the result can be different due to small discrepancies before rounding. Thus, for systems that require bitexact inference on neural networks it is crucial issue to replace such non-linearities of the mathematically defined activation functions by some approximation functions that can be calculated in a bitexact form on different platforms.

According to a first aspect, a neural network is provided, comprising at least one neural network layer and an activation function connected to an output of the at least one neural network layer, wherein the activation function is implemented as an approximation function of a mathematically defined real valued non-linear activation function (taking real numbers as arguments and outputting real numbers), and wherein the approximation function allows for integer-only processing of fixed-point representations of input values of the approximation function.

In fixed-point representation/arithmetic a real number is represented in a form mantissa*base$^{exponent}$ wherein both base and exponent are fixed and, accordingly, a fixed-point representation of a fractional number is essentially an integer, described in more detail below.

The approximation function approximates a mathematically defined real valued non-linear activation function used in the art (which often comprises one or more exponential function (with the base e) and process floating point representations of input values) in a manner that integer-only processing of fixed-point representations of input values is made possible (as, for example, for the ReLU function).

The integer-only processing allows for fixed-point neural networks in that bitexact behavior on different platforms. Thereby, interoperability between different platforms/devices can be improved significantly as compared to the art. Provision of such an approximated (approximation) activation function may allow for bitexact reproductions of crucial numerical operations on an encoder side and a decoder side, respectively, such that the technical effects obtained by these numerical operations are the same or complementary to each other. For example, a region of an image (still image or frame of a video sequence) can be (entropy) encoded on the encoder side and reconstructed without corruption on a decoder side when bitexact behavior on both sides can be obtained. Further, the internal operations (states) of the devices involved are defined in substantially the same manner by providing neural networks comprising the approximated activation function according to the first aspect for the different devices communicating with each other. The approximated activation function implemented in the neural network of the first aspect can be chosen in different manners as it will be discussed below but the disclosure is not restricted to one of these particular manners.

According to an implementation, the approximation function comprises at least one of a polynomial function, rational function, a finite Taylor series, the ReLU function, the Leaky ReLU function and the parametric ReLU function. According to an implementation of the neural network of the first aspect the mathematically defined non-linear activation function (that is to be approximated by the approximated activation function) is selected from a group consisting of the Softmax function, the sigmoid function, the hyperbolic tangent function, the Swish function the Gaussian Error Linear Unit function, and the Scaled Exponential Linear Unit function. For all of these mathematically defined non-linear activation functions that might be considered as suitable for an actual application an approximation function allowing for integer-only processing of fixed-point representations of input values can be found.

According to an implementation, the approximation function (approximated activation function) comprises a finite number of Taylor series summands which are determined based on at least one of a) expected input values of data input to be into the at least one neural network layer or the approximation function, b) an accumulator register size of an accumulator register for buffering summation results comprised by the neural network, and c) the approximation function.

According to an implementation, the approximation function is a polynomial function and the maximum degree of which is determined based on at least one of a) expected input values of data input to be into the at least one neural network layer or the approximation function, b) an accumulator register size of an accumulator register for buffering summation results comprised by the neural network, and c) the approximation function.

According to an implementation, the approximation function is a rational function and the maximum degrees of the polynomials in nominator and denominator of the rational function are determined based on at least one of a) expected input values of data input to be into the at least one neural network layer or the approximation function, b) an accumulator register size of an accumulator register for buffering summation results comprised by the neural network, and c) the approximation function.

4

When a Taylor series $$\sum_i \frac{f^{(i)}(a)}{i!}(x-a)^i$$

for the mathematically defined non-linear activation function f(x) is used the following may be observed according to an implementation:

$$-2^{n-1} \le (x-a)^i \le 2^{n-1}-1 \text{ for each } i = 0, 1, 2, \ldots k-1,$$

$$-2^{n-1} \le \frac{f^{(i)}(a)}{i!}(x-a)^i \le 2^{n-1}-1 \text{ for each } i = 0, 1, 2, \ldots k-1$$

and $$-2^{n-1} \le \sum_{i=0}^{k-1} \frac{f^{(i)}(a)}{i!}(x-a)^i \le 2^{n-1}-1,$$

wherein k denotes the number of summands of the Taylor series used for the approximation of the mathematically defined non-linear activation function f(x), and n denotes the bitdepth of an accumulator register comprised in the at least one neural network layer. When these conditions are fulfilled, advantageously, integer overflows that might be caused by conventional activations functions and might result in non-determined behaviors on different platforms can reliably be avoided.

It is noted that $2^{n-1}-1$ and $-2^{n-1}$ are examples for limits of the accumulator register size only and may be replaced in the conditions by other limits suitably defining the accumulator register size.

An activation function that is of particular importance in many applications is the Softmax $$(x)_i = \frac{e^{x_i}}{\sum_{j=1}^{K} e^{x_j}}$$

(i denoting the 1-th component of an input vector being the argument of the Softmax function and wherein the (normalizing) sum runs over all K components of that input vector). For example, the Softmax function might be used in the context of classification tasks by normalizing the output of a (final) neural network layer over a probability distribution.

According to implementation of the neural network of the first aspect, the mathematically defined non-linear activation function is the Softmax function and the approximation function (approximated activation function) is defined as $$f(x)_i = \frac{ReLU(x_i) + \varepsilon}{\sum_{j=1}^{K} (ReLU(x_j) + \varepsilon)}$$

wherein ε denotes a (small) positive constant avoiding division by zero.

According to a implementation, the (approximated activation function) is defined by $$f(x)_i = \frac{ReLU(1 + x_i) + \varepsilon}{\sum_{j=1}^{K} (ReLU(1 + x_j) + \varepsilon)}$$

5 wherein ε denotes a (small) positive constant avoiding division by zero.

The positive constant ε can be easily selected, for example, depending on expected values of the components of the input vector x. The positive constant ε may be in the range of $10^{-15}$ to $10^{-11}$, for example.

Numerically experiments have proven that these kinds of approximation functions for the Softmax function based on the ReLU function can guarantee bitexact behavior of the application of the activation function on different platforms.

Implementation of an approximated activation function may, advantageously, be realized in any neural network. Particularly, the neural network may be a convolutional or fully connected neural network or a convolutional or fully connected neural network layer.

According to a second aspect, it is provided (with the same advantages as provided by the neural network of the first aspect) a method of operating a neural network (for example, a convolutional or fully connected neural network) comprising at least one neural network layer, the method comprising implementing an approximation function of a mathematically defined real valued non-linear activation function as an activation function of the at least one neural network layer, wherein the approximation function allows for integer-only processing of fixed-point representations of input values of the approximation function.

According to an implementation, the approximation function comprises at least one of a polynomial function, rational function, a finite Taylor series, the ReLU function, the LeakyReLU function and the parametric ReLU function. According to a further implementation, the mathematically defined non-linear activation function is selected from a group consisting of the Softmax function, the sigmoid function, the hyperbolic tangent function, the Swish function the Gaussian Error Linear Unit function, and the Scaled Exponential Linear Unit function.

The approximation function may comprise a finite number of Taylor series summands which are determined based on expected input values of data input to be into the at least one neural network layer or the approximation function.

For the Taylor series $$\sum_i \frac{f^{(i)}(a)}{i!}(x-a)^i$$

for the mathematically defined non-linear activation function f(x) the following may hold:

$$-2^{n-1} \le (x-a)^i \le 2^{n-1}-1 \text{ for each } i=0,1,2,\ldots k-1,$$

$$-2^{n-1} \le \frac{f^{(i)}(a)}{i!}(x-a)^i \le 2^{n-1}-1 \text{ for each } i=0,1,2,\ldots k-1$$

and $$-2^{n-1} \le \sum_{i=0}^{k-1} \frac{f^{(i)}(a)}{i!}(x-a)^i \le 2^{n-1}-1,$$

wherein k denotes the number of summands of the Taylor series used for the approximation of the mathematically defined non-linear activation function f(x) and n denotes the bitdepth of an accumulator comprised in the at least one neural network layer.

The mathematically defined non-linear activation function may be the Softmax function and in this case the approximation function implemented according to the method of the second aspect an implementations thereof is given by $$f(x)_i = \frac{ReLU(x_i)+\varepsilon}{\sum_{j=1}^{K}(ReLU(x_j)+\varepsilon)}$$

wherein ε denotes a positive constant avoiding division by zero.

Alternatively, the approximation function is defined as $$f(x)_i = \frac{ReLU(1+x_i)+\varepsilon}{\sum_{j=1}^{K}(ReLU(1+x_j)+\varepsilon)}$$

wherein ε denotes a positive constant avoiding division by zero.

The positive constant ε can be easily selected, for example, depending on expected values of the components of the input vector x. The positive constant ε may be in the range of $10^{-15}$ to $10^{-11}$, for example. The second alternative for the approximated activation function representing the Softmax function is motivated by the approximation of $e^x \approx 1+x$ for small values of x close to 0.

The approximated activation function implemented in a neural network of the first aspect and the method of the second aspect may be advantageously applied to data coding (encoding and decoding) with the same or similar advantages as discussed above. Thus, according to a third aspect, it is provided a method of encoding data, comprising the steps of the method of operating a neural network according to the first aspect or any implementation of the same (with the same advantages as described above). In an implementation of the method of the third aspect, the encoding of the data comprises providing an entropy model by means of a neural network and entropy encoding of the data based on the provided entropy model wherein the providing of the entropy model comprises performing the steps of the method of operating a neural network according to the second aspect or any implementation of the same. The entropy encoding may comprise entropy encoding by means of an arithmetic encoder.

In the context of entropy coding interoperability between different platforms in terms of a substantially bitexact reproduction of an entropy model used on both an encoder side and a decoder side is essential for a reliable reconstruction of (compressed) data.

The entropy model provides statistical (probability) properties of symbols to be encoded or decoded, for example, mean values, variance, (cross) correlations, etc. and it may be provided by means of one of a) a hyperprior of a variational autoencoder, b) an autoregressive prior of a variational autoencoder, and c) a combination of a hyperprior and an autoregressive prior of a variational autoencoder. Thus, the method of the third aspect can, advantageously, be implemented in (variational) autoencoding systems, as described below:

According to a fourth aspect (and complementary to the third aspect), a method of decoding encoded data, comprising the steps of the method of operating a neural network according to the second aspect or any implementation of the same is provided (with the same advantages as described above). According to an implementation of the fourth aspect, the decoding of the data comprises providing an entropy model by means of a neural network and entropy decoding of the data based on the provided entropy model and wherein the entropy decoding of the data comprises the steps of the method of operating a neural network according to the second aspect or any implementation of the same. Entropy decoding may comprise entropy decoding by means of an arithmetic decoder. Also on the decoder side, according to an implementation of the fourth aspect, the entropy model is provided by means of one of a) a hyperprior of a variational autoencoder, b) an autoregressive prior of a variational autoencoder, and c) a combination of a hyperprior and an autoregressive prior of a variational autoencoder.

The data processed by the method of the third or fourth aspect may be image data, for example, representing a still image or a frame of a video sequence.

According to a fifth aspect, it is provided a method of encoding at least a portion of an image, comprising transforming a tensor representing a component of the image into a latent tensor, providing an entropy model; and processing the latent tensor by means of a neural network based on the provided entropy model to generate a bitstream, wherein the providing of the entropy model comprises performing the steps of the method of the second aspect or an implementation thereof (with the same advantages as described above). The latent tensor may be processed by means of an arithmetic encoder. The processing of the latent tensor to obtain a tensor representing the component of the image may comprises performing the steps of the method according to the first aspect or any of the implementations of the same.

The entropy model may be provided by means of one of a) a hyperprior of a variational autoencoder, b) an autoregressive prior of a variational autoencoder, and c) a combination of a hyperprior and an autoregressive prior of a variational autoencoder.

According to a sixth aspect, it is provided a method of reconstructing at least a portion of an image, comprising providing an entropy model, processing a bitstream by means of a neural network based on the provided entropy model to obtain a latent tensor representing a component of the image, and processing the latent tensor to obtain a tensor representing the component of the image, and wherein the providing of the entropy model comprises performing the steps of the method of operating a neural network according to the second aspect or any implementation of the same is provided (with the same advantages as described above). The processing of the bitstream may be performed by means of an arithmetic decoder. The entropy model may be provided by means of a one of a) a hyperprior of a variational autoencoder, b) an autoregressive prior of a variational autoencoder, and c) a combination of a hyperprior and an autoregressive prior of a variational autoencoder. Further, the processing of the latent tensor to obtain a tensor representing the component of the image may comprise performing the steps of the method according to the twenty-first aspect or an implementation thereof.

The component of the image represented by the tensor according to the method of the fifth and sixth aspects, may be a Y, U or V component or is an R, G, B component.

According to a seventh aspect it is provided an approximated activation function (approximating the Softmax function)

$$f(x)_i = \frac{ReLU(x_i) + \varepsilon}{\sum_{j=1}^{K}(ReLU(x_j) + \varepsilon)}$$

wherein ε denotes a positive constant avoiding division by zero.

According to an eight aspect it is provided an approximated activation function (approximating the Softmax function)

$$f(x)_i = \frac{ReLU(1 + x_i) + \varepsilon}{\sum_{j=1}^{K}(ReLU(1 + x_j) + \varepsilon)}$$

wherein ε denotes a positive constant avoiding division by zero.

The positive constant ε can be easily selected, for example, depending on expected values of the components of the input vector x. The positive constant ε may be in the range of $10^{-15}$ to $10^{-11}$, for example.

These new activation functions may replace the conventional Softmax function and may prove superior with respect to interoperability of device (as encoder and decoders).

According to a ninth aspect, it is provided an apparatus for encoding data, comprising the neural network according to the first aspect or any implementation thereof.

According to a tenth aspect, it is provided an apparatus for decoding data, comprising the neural network according to the first aspect or any implementation thereof.

According to an eleventh aspect, it is provided an apparatus for encoding at least a portion of an image, comprising the neural network according to the first aspect or any implementation thereof.

According to a twelfth aspect, it is provided an apparatus for decoding at least a portion of an image, comprising the neural network according to the first aspect or any implementation thereof.

According to a thirteenth aspect, it is provided an apparatus according to one of the twenty-second to twelfth aspect, comprising a hyperprior of a variational autoencoder, the hyperprior comprising the neural network according to the first aspect or any implementation thereof.

According to a fourteenth aspect, it is provided an apparatus for encoding at least a portion of an image, comprising processing circuitry configured for transforming a tensor representing a component of the image into a latent tensor, providing an entropy model by means of the neural network according to the first aspect, or any implementation thereof, and processing the latent tensor based on the provided entropy model to generate a bitstream.

According to a fifteenth aspect, it is provided an apparatus for decoding at least a portion of an encoded image, comprising processing circuitry configured for providing an entropy model by means of the neural network according to the first aspect, or any implementation thereof, processing a bitstream based on the provided entropy model to obtain a latent tensor representing a component of the image, and processing the latent tensor to obtain a tensor representing the component of the image.

The component of the image may be a Y, U or V component or may be an R, G, B component.

According to a sixteenth aspect, the present disclosure relates to a method of operating a neural network comprising at least one neural network layer comprising or connected with an accumulator register for buffering summation results. The method comprises defining an integer lower threshold value and an integer upper threshold value for values of integer numbers comprised in data entities of input data for the at least one neural network layer. The method further comprises, if a value of an integer number comprised in a data entity of the input data is smaller than the defined integer lower threshold value, clipping the value of the integer number comprised in the data entity of the input data to the defined integer lower threshold value, and if a value of an integer number comprised in a data entity of the input data is larger than the defined integer upper threshold value, clipping the value of the integer number comprised in the data entity of the input data to the defined integer upper threshold value such that integer overflow of the accumulator register is avoided.

According to the method of the sixteenth aspect, due to the clipping of the integer valued data (comprising integer numbers) input into the neural network layer, interoperability between different platforms/devices can be improved significantly as compared to the art. The clipping may allow for bitexact reproductions of crucial numerical operations on an encoder side and a decoder side, respectively, such that the technical effects obtained by these numerical operations are the same or complementary to each other. For example, a region of an image (still image or frame of a video sequence) can be (entropy) encoded on the encoder side and reconstructed without corruption on a decoder side when integer overflow that might result in non-determined behaviors on different platforms can reliably avoided. In general, there is no standardized handling of overflow situations and hardly can any generally followed procedure be imagined in this respect. Integer overflow occurs when an arithmetic operation attempts to create a numeric value that is outside of the range that can be represented with a given number of digits—either higher than the maximum or lower than the minimum representable value. This situation can be processed differently for different compilers, devices central processing unit, graphics processing unit (CPU. GPU) and so on. In order to achieve bitexact result of integer operations on different platforms integer overflows should be avoided. According to the method of the sixteenth aspect, integer overflow of the accumulator register can be avoided on both encoder and decoder sides. Further, the internal operations (states) of the devices involved are defined in substantially the same manner by providing the clipping of the input data values according to the method of the sixteenth aspect.

According to an implementation, the method of the sixteenth aspect further comprises scaling data entities of the input data that (that have real numbers or integer numbers) by a first scaling factor (i.e., the data entities of the input data are multiplied by the first scaling factor) to obtain scaled values of the data entities of the input data. The scaling may be performed in order to improve handling of the input data values on different devices. Particularly, the scaling may be supplemented by rounding the scaled values of the data entities of the input data to the respective closest integer values to obtain the integer values of the data entities of the input data. The rounding can be done by a floor function or ceil function. Thereby, for example, real numbers of input data that might be originally provided can be processed by the disclosed method of operating a neural network.

Output data may be obtained by processing the input data by the at least one neural network layer and when the first scaling factor is applied, according to an implementation, output data entities comprised by the output data are divided by a third scaling factor in order to obtain de-scaled results. The de-scaling may be performed directly on the outputs of the at least one neural network layer or after processing by activation functions. Thus, according to an implementation the input data is processed by the at least one neural network layer to obtain output data comprising output data entities, the output data entities are processed by activation functions to obtain outputs of the activation functions, and the outputs of the activation function are divided by a third scaling factor.

According to an implementation, the method of the sixteenth aspect further comprises processing the input data by the at least one neural network layer to obtain output data comprising output data entities, factorizing a third scaling factor into a first part and a second part, dividing the output data entities by the first part of the factorized third scaling factor to obtain partially un-scaled output data entities, processing the partially un-scaled output data entities by activation functions to obtain outputs of the activation functions, and dividing the outputs of the activation functions by the second part of the factorized third scaling factor. Since all the options of de-scaling may be implemented the de-scaling process can be performed with a high flexibility.

The above-mentioned integer lower threshold value used in the method of the sixteenth aspect can be less than or equal to 0 and the integer upper threshold value can be greater than or equal to 0. Suitable possible choices for the threshold values employed are $-2^{k-1}$ for the integer lower threshold value and $2^{k-1}-1$ for the integer the upper threshold value, wherein k denotes a pre-defined bitdepth (bit size) of the input data.

The method of the sixteenth aspect may be advantageously applied to any kind of neural network and neural network layer. According to an implementation, the at least one neural network layer is or comprises one of a fully connected neural network layer and a convolutional neural network layer. Furthermore, the at least one neural network layer may comprise an attention mechanism as described below.

According to an implementation, the at least one neural network layer comprises integer valued weights. Thereby, the interoperability of platforms/devices may be even further improved and the risk for integer overflow of the accumulator register size can be further reduced as described below.

According to an implementation, weights, real valued weights (weights comprising real numbers, for example, only real numbers) or integer valued weights, are originally provided and scaled by second scaling factors to obtain scaled weights and the scaled weights are rounded to the respective closest integer values to obtain the integer valued weights of the at least one neural network. Thereby, the method of the sixteenth aspect can be used for originally provided (for example, user dependently) real valued weights.

The second scaling factors may suitably be given by $2^{s_j}$ wherein $s_j$ represents the fractional part of the real valued weights. Particularly, according to an implementation, $s_j$ of the second scaling factor for the j-th output channel of the at least one neural network layer fulfills the condition $$s_j < \log_2\left[\frac{2^{n-k} - 1 - \frac{|W_j|}{2} - \frac{|b_j|}{2^{k-1}}}{\sum_{w_i \in W_j} |w_i|}\right]$$

wherein $W_j$ denotes a subset of trainable weights of the at least one neural network layer, $|W_j|$ denotes number of elements in subset $W_j$, n denotes a bit size of the accumulator register, k denotes a pre-defined bitdepth of the input data and $b_j$ denotes the bias value (that might be zero).

According to another implementation, $s_j$ of the second scaling factor for the j-th output channel of the at least one neural network layer is given by $$s_j = \left\lfloor \left| \log_2 \left[ \frac{2^{n-k} - 1 - \frac{|W_j|}{2} - \frac{|b_j|}{2^{k-1}}}{\sum_{w_i \in W_j} |w_i|} \right] \right| \right\rfloor.$$

$$\lfloor x \rfloor = \text{floor}(x)$$

Both conditions can advantageously guarantee that no integer overflow will occur for the accumulator register.

According to another implementation the conditions are $$s_j < \log_2 \left[ \frac{2^{n-k} - 1 - \frac{C_{in}}{2} - \frac{|b_j|}{2^{k-1}}}{\sum_{i=0}^{C_{in}-1} |w_{ij}|} \right]$$

and $$s_j = \left\lfloor \left| \log_2 \left[ \frac{2^{n-k} - 1 - \frac{C_{in}}{2} - \frac{|b_j|}{2^{k-1}}}{\sum_{i=0}^{C_{in}-1} |w_{ij}|} \right] \right| \right\rfloor.$$

wherein $C_{in}$ denotes the number of input channels of the neural network layer.

Both conditions can advantageously guarantee that no integer overflow will occur for the accumulator register.

As already stated the method of the sixteenth aspect may be advantageously applied to data coding (encoding and decoding) with the same or similar advantages as discussed above. Coding decoding of data, particularly, based on entropy coding, represents a delicate process wherein interoperability of at least some of the procedures carried out on different devices should give the same results to numerical accuracy. Thus, according to a seventeenth aspect, it is provided a method of encoding data, comprising the steps of the method of operating a neural network according to the sixteenth aspect or any implementation of the same (with the same advantages as described above). In an implementation of the method of the seventeenth aspect, the encoding of the data comprises providing an entropy model by means of a neural network and entropy encoding of the data based on the provided entropy model wherein the providing of the entropy model comprises performing the steps of the method of operating a neural network according to the sixteenth aspect or any implementation of the same. The entropy encoding may comprise entropy encoding by means of an arithmetic encoder.

In the context of entropy coding interoperability between different platforms in terms of a substantially bitexact reproduction of an entropy model used on both an encoder side and a decoder side is essential for a reliable reconstruction of (compressed) data.

The entropy model provides statistical (probability) properties of symbols to be encoded or decoded, for example, mean values, variance, (cross) correlations, etc. and it may be provided by means of one of a) a hyperprior of a variational autoencoder, b) an autoregressive prior of a variational autoencoder, and c) a combination of a hyperprior and an autoregressive prior of a variational autoencoder. Thus, the method of the seventeenth aspect can, advantageously, be implemented in (variational) autoencoding systems as described below.

The method of encoding data as described above may further comprise signaling the defined lower threshold value and the defined upper threshold value to a decoder side. Thereby, the decoder side can be readily provided with information needed for the same processing with respect to the clipping procedure of input data as performed by the encoder side. Similarly, at least one of the first scaling factor and the second scaling factors and the third scaling factor may be signaled in a bitstream to a decoder side.

Further, the method may comprise signaling a difference to a pre-defined lower threshold value and a difference to a pre-defined upper threshold value to a decoder side. Further, the method may comprise signaling at least one of a difference to a pre-defined first scaling factor and differences to pre-defined second scaling factors in a bitstream to a decoder side. Exponential-Golomb coding may be used for the signaling.

According to a eighteenth aspect (and complementary to the seventeenth aspect), a method of decoding encoded data, comprising the steps of the method of operating a neural network according to the sixteenth aspect or any implementation of the same is provided (with the same advantages as described above). According to an implementation of the eighteenth aspect, the decoding of the data comprises providing an entropy model by means of a neural network and entropy decoding of the data based on the provided entropy model and wherein the entropy decoding of the data comprises the steps of the method of operating a neural network according to the sixteenth aspect or any implementation of the same. Entropy decoding may comprise entropy decoding by means of an arithmetic decoder. Also on the decoder side, according to an implementation of the eighteenth aspect, the entropy model is provided by means of one of a) a hyperprior of a variational autoencoder, b) an autoregressive prior of a variational autoencoder, and c) a combination of a hyperprior and an autoregressive prior of a variational autoencoder.

Information on the defined lower threshold value and the defined upper threshold value may be received on the decoder side in a bitstream from an encoder side. Similarly, information on at least one of the first scaling factor and the second scaling factors and the third scaling factor may be received on the decoder side in a bitstream from an encoder side.

Further, the method may comprise receiving information on a difference to a pre-defined lower threshold value and a difference to a pre-defined upper threshold value to a decoder side. Further, the method may comprise receiving information on at least one of a difference to a pre-defined first scaling factor and differences to pre-defined second scaling factors in a bitstream to a decoder side.

The data processed by the method of the seventeenth or eighteenth aspect may be image data, for example, representing a still image or a frame of a video sequence.

According to a nineteenth aspect, it is provided a method of encoding at least a portion of an image, comprising transforming a tensor representing a component of the image into a latent tensor, providing an entropy model; and processing the latent tensor by means of a neural network based on the provided entropy model to generate a bitstream, wherein the providing of the entropy model comprises performing the steps of the method of the sixteenth aspect or an implementation thereof (with the same advantages as described above). The latent tensor may be processed by means of an arithmetic encoder. The processing of the latent tensor to obtain a tensor representing the component of the image may comprises performing the steps of the method according to the sixteenth aspect or any of the implementations of the same.

The entropy model may be provided by one of a) a hyperprior of a variational autoencoder, b) an autoregressive prior of a variational autoencoder, and c) a combination of a hyperprior and an autoregressive prior of a variational autoencoder.

According to an implementation, the method of the nineteenth aspect further comprises signaling the defined lower threshold value and the defined upper threshold value in the bitstream to a decoder side.

Further, at least one of the first scaling factor and the second scaling factors and the third scaling factor may be signaled in the bitstream to a decoder side.

Further, the method may comprise signaling a difference to a pre-defined lower threshold value and a difference to a pre-defined upper threshold value to a decoder side. Further, the method may comprise signaling at least one of a difference to a pre-defined first scaling factor and differences to pre-defined second scaling factors in a bitstream to a decoder side. Exponential-Golomb coding may be used for the signaling.

According to a twentieth aspect, it is provided a method of reconstructing at least a portion of an image, comprising providing an entropy model, processing a bitstream by means of a neural network based on the provided entropy model to obtain a latent tensor representing a component of the image, and processing the latent tensor to obtain a tensor representing the component of the image, and wherein the providing of the entropy model comprises performing the steps of the method of operating a neural network according to the sixteenth aspect or any implementation of the same is provided (with the same advantages as described above). The processing of the bitstream may be performed by means of an arithmetic decoder. The processing of the latent tensor to obtain a tensor representing the component of the image may comprise performing the steps of the method according to the sixteenth aspect or any of the implementations of the same.

The entropy model may be provided by one of a) a hyperprior of a variational autoencoder, b) an autoregressive prior of a variational autoencoder, and c) a combination of a hyperprior and an autoregressive prior of a variational autoencoder According to an implementation, the method of the twentieth aspect comprises reading information on the defined lower threshold value and the defined upper threshold value from the bitstream. Further, at least one of the first scaling factor, the second scaling factor, and the third scaling factor may be read from the bitstream.

Further, the method may comprise receiving information on a difference to a pre-defined lower threshold value and a difference to a pre-defined upper threshold value to a decoder side. Further, the method may comprise receiving information on at least one of a difference to a pre-defined first scaling factor and differences to pre-defined second scaling factors in a bitstream to a decoder side.

The component of the image represented by the tensor according to the method of the third and nineteenth aspect, may be a Y, U or V component or is an R, G, B component.

According to a twenty-first aspect, the present disclosure relates to a method of operating a neural network comprising a neural network layer comprising or connected with an accumulator register for buffering summation results and having a pre-defined accumulator register size. The method comprises defining an integer lower threshold value, A, and an integer upper threshold value, B, for values of integer numbers comprised in data entities (numbers, vectors, or tensors, for example) of input data for the neural network layer. Further, the method comprises if a value of an integer number comprised in a data entity of the input data is smaller than the defined integer lower threshold value, clipping the value of the integer number comprised in the data entity of the input data to the defined integer lower threshold value, and if a value of an integer number comprised in a data entity of the input data is larger than the defined integer upper threshold value, clipping the value of the integer number comprised in the data entity of the input data to the defined integer upper threshold value. Further, the method comprises determining integer valued weights (i.e., the weights comprising integer numbers, for example, integer numbers only) of the neural network layer based on the defined integer lower threshold value, the defined integer upper threshold value and the pre-defined accumulator register size, such that integer overflow of the accumulator register can be avoided.

According to the method of the twenty-first aspect, the integer valued weights of the neural network layer of the neural network are conditioned such that integer overflow of the accumulator register can be avoided given that the input data is clipped to the defined thresholds. Thereby, interoperability between different platforms/devices can be improved significantly as compared to the art. The conditioning of the weights may allow for bitexact reproductions of crucial numerical operations on an encoder side and a decoder side, respectively, such that the technical effects obtained by these numerical operations are the same or complementary to each other. For example, a region of an image (still image or frame of a video sequence) can be (entropy) encoded on the encoder side and reconstructed without corruption on a decoder side when integer overflow of the accumulator register can be avoided on both sides. Further, the internal operations (states) of the devices involved are defined in substantially the same manner by providing the conditioned weights determined according to the method of the twenty-first aspect. The integer valued weights can be determined such that integer overflow of the accumulator register can be avoided in different manners as is described below but the disclosure is not restricted to one of these particular manners.

The method of the twenty-first aspect works for arbitrary kinds of neural network layers including fully connected neural network layers and convolutional neural network layer. The method of the twenty-first aspect might also advantageously be implemented in a transformer architecture and, in this case, the neural network layer comprises some attention mechanism as described below. The accumulator register size can be n bits, wherein n is a positive integer value, for example, n=32 bits or n=16 bits. Stored values are in a range of $-2^{n-1}$ to $2^{n-1}-1$ or in a range 0 to $2^{n-1}$. The accumulator register size can be a fixed size or it can be dynamically allocated.

According to an implementation, wherein the integer lower threshold value is less than or equal to 0 and the integer upper threshold value is greater than or equal to 0. Restriction to non-negative integer values of input data is, thus, possible or negative integer input values may be allowed as it is considered appropriate for an actual application.

According to an implementation, the integer lower threshold value A is given by $-2^{k-1}$ and the upper integer threshold value B is given by $2^{k-1}-1$, wherein k denotes a pre-defined bitdepth of the layer input data. The bitdepth of the layer input data is usually known for a particular application and configuration used and can, therefore, be readily used for the definition of the clipping thresholds applied to the input data.

The conditioned weights are usually used in summation processing performed by the neural network layer. According to an implementation, the neural network layer is configured to perform a summation (accumulated in the so-called accumulator register mentioned above)

$$D + \sum_{\substack{x_i \in X \\ w_i \in W}} w_i x_i$$

wherein D denotes an integer value (bias), W denotes a subset of trainable layer weights $w_i$, and X denotes one of a set and a subset of the input data of the neural network layer. Convolutions or simpler algebraic multiplications may be included in the summation process.

Particular concrete formulations for determining the integer valued weights such that integer overflow of the accumulator register can be avoided are envisaged herein. According to an implementation, the integer valued weights $\{w_i\}$ of the neural network layer are determined to fulfill the conditions $$\begin{cases} \max(B, 0) \sum_{w_i \in W | w_i > 0} w_i + \max(-A, 0) \sum_{w_i \in W | w_i < 0} |w_i| + \max(D, 0) \le 2^{n-1} - 1 \\ \max(-A, 0) \sum_{w_i \in W | w_i > 0} w_i + \max(B, 0) \sum_{w_i \in W | w_i < 0} |w_i| + \max(-D, 0) \le 2^{n-1} \end{cases}$$

Given that the values of the input data are restricted to lie between the defined lower and upper threshold values A and B, integer overflow of the accumulator register can be reliably avoided if these conditions are fulfilled. It is noted that $2^{n-1}-1$ and $-2^{n-1}$ are given as examples for limits of the accumulator register size only and may be replaced by other limits suitably defining the accumulator register size.

According to an another implementation, the integer valued weights $\{w_i\}$ are determined to fulfill the conditions $$\begin{cases} \sum_{w_i \in W} |w_i| \le 2^{n-k} - \dfrac{\max(D, 0)}{2^{k-1}} - 1 \\ \sum_{w_i \in W} |w_i| \le 2^{n-k} - \dfrac{\max(-D, 0)}{2^{k-1}} \end{cases}$$

such that integer overflow of the accumulator register is avoided.

According to an another implementation the integer valued weights $\{w_i\}$ are determined to fulfill the conditions the condition $$\sum_{w_i \in W} |w_i| \le 2^{n-k} - \frac{|D|}{2^{k-1}} - 1$$

such that integer overflow of the accumulator register is avoided. The latest two conditions which can be particularly easily checked. It is noted that the bias D might be equal to zero in all of the above-described implementations.

The summation $\Sigma_{w_i \in W} |w_i|$ in these implementations can be obtained for a convolutional neural network layer differently depending on the dimension (number of kernels) of that layer. For a one-dimensional neural network layer this summation can be obtained by $$\sum_{i=0}^{C_{in}-1} \sum_{k_1=0}^{K_1-1} |w_{ijk_1}|$$

wherein $C_{in}$ denotes the number of input channels of the neural network layer, $K_1$ denotes a convolution kernel size and j denotes an index of an output channel of the neural network layer.

For a two-dimensional layer the summation can be obtained by $$\sum_{i=0}^{C_{in}-1} \sum_{k_1=0}^{K_1-1} \sum_{k_2=0}^{K_2-1} |w_{ijk_1k_2}|$$

wherein $C_{in}$ denotes the number of input channels of the neural network layer, $K_1$ and $K_2$ denote convolution kernel sizes and j denotes an index of an output channel of the neural network layer and, accordingly, for an N-dimensional convolutional neural network layer the same summation can be obtained by $$\sum_{i=0}^{C_{in}-1} \sum_{k_1=0}^{K_1-1} \sum_{k_2=0}^{K_2-1} \cdots \sum_{k_N=0}^{K_N-1} |w_{ijk_1k_2\ldots k_N}|$$

wherein $C_{in}$ denotes the number of input channels of the neural network layer, $K_1$, $K_2$, . . . , $K_N$ denote convolution kernel sizes and j denotes an index of an output channel of the neural network layer.

For all of these sums the above-described conditions have to be fulfilled for each of the output channels of the neural network layer.

In particular, user dependent application weights of a neural network layer of a neural network may be provided as real valued weights (i.e., the weights comprise real numbers, for example, real numbers only). In this case also, the method of the twenty-first aspect and its implementations can, advantageously, be used. In this case, according to an implementation, provided real valued weights are scaled by first scaling factors to obtain scaled weights and the scaled weights may be rounded to the respective closest integer values to obtain the integer valued weights. The scaling factors can be chosen with high flexibility. It might be considered suitable, to have the first scaling factors given by $2^{s_j}$, wherein $s_j$ denotes the number of bits representing the fractional parts of the real valued weights.

According to an implementation of the method of the twenty-first aspect, $s_j$ of the first scaling factor for the j-th output channel of the at least one neural network layer fulfills the condition $$s_j < \log_2 \left[ \frac{2^{n-k} - 1 - \dfrac{|W_j|}{2} - \dfrac{|b_j|}{2^{k-1}}}{\sum_{w_i \in W_j} |w_i|} \right]$$

wherein $W_j$ denotes a subset of trainable weights of the at least one neural network layer, $|W_j|$ denotes number of elements in subset $W_j$, n denotes a bit size of the accumulator register, k denotes a pre-defined bitdepth of the input data and $b_j$ denotes the bias value (that might be zero).

According to an implementation, $s_j$ of the second scaling factor for the j-th output channel of the at least one neural network layer is given by $$s_j = \left\lfloor \log_2 \left[ \frac{2^{n-k} - 1 - \frac{|W_j|}{2} - \frac{|b_j|}{2^{k-1}}}{\sum_{w_i \in W_j} |w_i|} \right] \right\rfloor.$$

$$\lfloor x \rfloor = \text{floor}(x)$$

Both conditions can advantageously guarantee that no integer overflow will occur for the accumulator register.

According to an implementation the conditions are $$s_j < \log_2 \left[ \frac{2^{n-k} - 1 - \frac{C_{in}}{2} - \frac{|b_j|}{2^{k-1}}}{\sum_{i=0}^{C_{in}-1} |w_{ij}|} \right]$$

and $$s_j = \left\lfloor \log_2 \left[ \frac{2^{n-k} - 1 - \frac{C_{in}}{2} - \frac{|b_j|}{2^{k-1}}}{\sum_{i=0}^{C_{in}-1} |w_{ij}|} \right] \right\rfloor.$$

wherein $C_{in}$ denotes the number of input channels of the neural network layer.

Both conditions can advantageously guarantee that no integer overflow will occur for the accumulator register.

Similarly, according to an implementation, the method comprises scaling data entities of the input data by second scaling factors to obtain scaled values of the data entities. The scaled values of the data entities may be rounded to the respective closest integer values to obtain the integer values of the data entities.

As already stated the method of the twenty-first aspect may be advantageously applied to data coding (encoding and decoding) with the same or similar advantages as discussed above. Thus, according to a twenty-second aspect, it is provided a method of encoding data, comprising the steps of the method of operating a neural network according to the twenty-first aspect or any implementation of the same. In an implementation of the method of the twenty-second aspect, the encoding of the data comprises providing an entropy model by means of a neural network and entropy encoding of the data based on the provided entropy model wherein the providing of the entropy model comprises performing the steps of the method of operating a neural network according to the twenty-first aspect or any implementation of the same. In the context of entropy coding interoperability between different platforms in terms of a substantially bitexact reproduction of an entropy model used on both an encoder side and a decoder side is essential for a reliable reconstruction of (compressed) data.

The entropy model provides statistical (probability) properties of symbols to be encoded or decoded, for example, mean values, variance, (cross) correlations, etc. and it may be provided by one of a) a hyperprior of a variational autoencoder, b) an autoregressive prior of a variational autoencoder, and c) a combination of a hyperprior and an autoregressive prior of a variational autoencoder. Thus, the method of the twenty-second aspect can, advantageously, be implemented in (variational) autoencoding systems as described below.

According to a twenty-third aspect (and complementary to the twenty-second aspect), a method of decoding encoded data, comprising the steps of the method of operating a neural network according to the twenty-first aspect or any implementation of the same is provided. According to an implementation of the twenty-third aspect, the decoding of the data comprises providing an entropy model by means of a neural network and entropy decoding of the data based on the provided entropy model, and wherein the entropy decoding of the data comprises the steps of the method of operating a neural network according to the twenty-first aspect or any implementation of the same. Also on the decoder side, according to an implementation of the twenty-third aspect, the entropy model is provided by one of a) a hyperprior of a variational autoencoder, b) an autoregressive prior of a variational autoencoder, and c) a combination of a hyperprior and an autoregressive prior of a variational autoencoder.

The data processed by the method of the twenty-second or twenty-third aspect may be image data, for example, representing a still image or a frame of a video sequence.

According to a twenty-fourth aspect, it is provided a method of encoding at least a portion of an image, comprising transforming a tensor representing a component of the image into a latent tensor, providing an entropy model and processing the latent tensor by means of a neural network based on the provided entropy model to generate a bitstream, wherein the providing of the entropy model comprises performing the steps of the method according to the twenty-first aspect or an implementation thereof (with the same of similar advantages as described above). According to an implementation of the twenty-fourth aspect, the entropy model is provided by one of a) a hyperprior of a variational autoencoder, b) an autoregressive prior of a variational autoencoder, and c) a combination of a hyperprior and an autoregressive prior of a variational autoencoder.

According to a twenty-fifth aspect, it is provided a method of reconstructing at least a portion of an image, comprising providing an entropy model, processing a bitstream by a neural network based on the provided entropy model to obtain a latent tensor representing a component of the image and processing the latent tensor to obtain a tensor representing the component of the image, wherein the providing of the entropy model comprises performing the steps of the method according to the twenty-first aspect or an implementation thereof (with the same of similar advantages as described above). Again, the entropy model may be provided by one of a) hyperprior of a variational autoencoder, b) an autoregressive prior of a variational autoencoder, and c) a combination of a hyperprior and an autoregressive prior of a variational autoencoder.

The above-mentioned image component represented by a tensor may be a Y, U or V component or is an R, G, B component, for example.

According to a twenty-sixth aspect, it is provided a neural network, comprising a neural network layer configured for processing input data to obtain output data and an activation function configured to process the output data to obtain activation function output data, a first unit for scaling, rounding, and clipping the input data to be input into the neural network layer, and a second unit for de-scaling at least one of the output data and the activation function output data. The first unit may be divided into sub-units each configured for different operations as the scaling, rounding, and clipping of the input data, and on- and off-operation of the first unit and each of the sub-units, respectively, may be switchable.

The first unit may be configured to perform the steps of the method according to the sixteenth to twenty-fifth aspects and the implementations thereof.

According to an implementation, the neural network of the twenty-sixth aspect is configured to perform the steps of the method according to the sixteenth to twenty-sixth aspects and the implementations thereof.

According to a twenty-seventh aspect, it is provided an apparatus for encoding at least a portion of an image, comprising the neural network according to the twenty-sixth aspect and the implementations thereof. The apparatus of the twenty-seventh aspect may comprise one of a) hyperprior of a variational autoencoder, b) an autoregressive prior of a variational autoencoder, and c) a combination of a hyper-prior and an autoregressive prior of a variational autoencoder each of the priors comprising the neural network of the twenty-sixth aspect or implementations thereof.

According to a twenty-eighth aspect, it is provided an apparatus for decoding at least a portion of an encoded image, comprising the neural network according to the twenty-sixth aspect and the implementations thereof. The apparatus can be an apparatus for decoding at least a portion of an image and it may comprise one of a) hyperprior of a variational autoencoder, b) an autoregressive prior of a variational autoencoder, and c) a combination of a hyper-prior and an autoregressive prior of a variational autoencoder each of the priors comprising the neural network of the twenty-sixth aspect or implementations thereof.

According to a twenty-ninth aspect, it is provided a computer program product comprising a program code stored on a non-transitory medium, wherein the program, when executed on one or more processors, performs the method according to any of the above described aspects related to methods and any implementations thereof.

According to a thirtieth aspect, it is provided a computer program product comprising a program code stored on a non-transitory medium, wherein the program, when executed on one or more processors, performs the method according to any of the above described aspects related to methods and any implementations thereof.

According to a thirty-first aspect, it is provided a computer-readable storage medium having stored thereon instructions that when executed cause one or more processors to encode video data is proposed. The instructions cause the one or more processors to perform the method according to any of the above described aspects related to methods and any implementations thereof.

The methods according to any of the above described aspects related to methods and any implementations thereof can be implemented in apparatuses and apparatuses are provided that are configured to perform the steps of such methods (with the same advantages as discussed above).

According to a thirty-second aspect, it is provided an apparatus for encoding data, wherein the apparatus comprises processing circuitry configured for performing the steps of any of the methods according to any of the above described aspects related to methods and any implementations thereof that are not restricted to decoding.

According to a thirty-third aspect, it is provided an apparatus for encoding at least a portion of an image, comprising processing circuitry configured for transforming a tensor representing a component of the image into a latent tensor, providing an entropy model comprising performing the steps of any of the methods according to any of the above described aspects related to methods and any implementations thereof that are not restricted to decoding, and processing the latent tensor by means of a neural network based on the provided entropy model to generate a bitstream.

According to a thirty-fourth aspect, it is provided an apparatus for decoding data, wherein the apparatus comprises processing circuitry configured for performing the steps of any of the methods according to any of the above described aspects related to methods and any implementations thereof that are not restricted to encoding.

According to a thirty-fifth aspect, it is provided an apparatus for decoding at least a portion of an encoded image, comprising processing circuitry configured for providing an entropy model comprising performing the steps of any of the methods according to any of the above described aspects related to methods and any implementations thereof that are not restricted to encoding, processing a bitstream by means of a neural network based on the provided entropy model to obtain a latent tensor representing a component of the image, and processing the latent tensor to obtain a tensor representing the component of the image.

The functions of the above-described apparatuses may be implemented by hardware or may be implemented by hardware executing corresponding software.

According to a further aspect, the present disclosure relates to a video stream encoding apparatus, including a processor and a memory. The memory stores instructions that cause the processor to perform the steps of any of the methods according to any of the above described aspects related to methods and any implementations thereof that are not restricted to decoding.

According to a further aspect, the present disclosure relates to a video stream decoding apparatus, including a processor and a memory. The memory stores instructions that cause the processor to perform the steps of any of the methods according to any of the above described aspects related to methods and any implementations thereof that are not restricted to encoding.

Methods as well as apparatuses of the above-described aspects and implementations can be readily combined with each other when it is considered suitable.

Details of one or more embodiments are set forth in the accompanying drawings and the description below.

According to a twenty-ninth aspect, it is provided a computer program product comprising a program code stored on a non-transitory medium, wherein the program, when executed on one or more processors, performs the method according to any of the above described aspects related to methods and any implementations thereof.

According to a thirtieth aspect, it is provided a computer program product comprising a program code stored on a non-transitory medium, wherein the program, when executed on one or more processors, performs the method according to any of the above described aspects related to methods and any implementations thereof.

According to a thirty-first aspect, it is provided a computer-readable storage medium having stored thereon instructions that when executed cause one or more processors to encode video data. The instructions cause the one or more processors to perform the method according to any of the above described aspects related to methods and any implementations thereof.

The methods according to any of the above described aspects related to methods and any implementations thereof can be implemented in apparatuses and apparatuses are provided that are configured to perform the steps of such methods (with the same advantages as discussed above).

According to a thirty-second aspect, it is provided an apparatus for encoding data, wherein the apparatus comprises processing circuitry configured for performing the steps of any of the methods according to any of the above described aspects related to methods and any implementations thereof that are not restricted to decoding.

According to a thirty-third aspect, it is provided an apparatus for encoding at least a portion of an image, comprising processing circuitry configured for transforming a tensor representing a component of the image into a latent tensor, providing an entropy model comprising performing the steps of any of the methods according to any of the above described aspects related to methods and any implementations thereof that are not restricted to decoding, and processing the latent tensor by a neural network based on the provided entropy model to generate a bitstream.

According to a thirty-fourth aspect, it is provided an apparatus for decoding data, wherein the apparatus comprises processing circuitry configured for performing the steps of any of the methods according to any of the above described aspects related to methods and any implementations thereof that are not restricted to encoding.

According to a thirty-fifth aspect, it is provided an apparatus for decoding at least a portion of an encoded image, comprising processing circuitry configured for providing an entropy model comprising performing the steps of any of the methods according to any of the above described aspects related to methods and any implementations thereof that are not restricted to encoding, processing a bitstream by means of a neural network based on the provided entropy model to obtain a latent tensor representing a component of the image, and processing the latent tensor to obtain a tensor representing the component of the image.

The functions of the above-described apparatuses may be implemented by hardware or may be implemented by hardware executing corresponding software.

According to a further aspect, the present disclosure relates to a video stream encoding apparatus, including a processor and a memory. The memory stores instructions that cause the processor to perform the steps of any of the methods according to any of the above described aspects related to methods and any implementations thereof that are not restricted to decoding.

According to a further aspect, the present disclosure relates to a video stream decoding apparatus, including a processor and a memory. The memory stores instructions that cause the processor to perform the steps of any of the methods according to any of the above described aspects related to methods and any implementations thereof that are not restricted to encoding.

Methods as well as apparatuses of the above-described aspects and implementations can be readily combined with each other when it is considered suitable.

Details of one or more embodiments are set forth in the accompanying drawings and the description below.

BRIEF DESCRIPTION OF THE DRAWINGS

In the following embodiments of the present disclosure are described in more detail with reference to the attached figures and drawings, in which

FIG. 9 illustrates a neural network in accordance with an embodiment;

FIG. 13 is a flow chart illustrating a method of operating a neural network comprising implementing an approximation activation function;

Like reference numbers and designations in different drawings may indicate similar elements.

DETAILED DESCRIPTION

Figure 1:
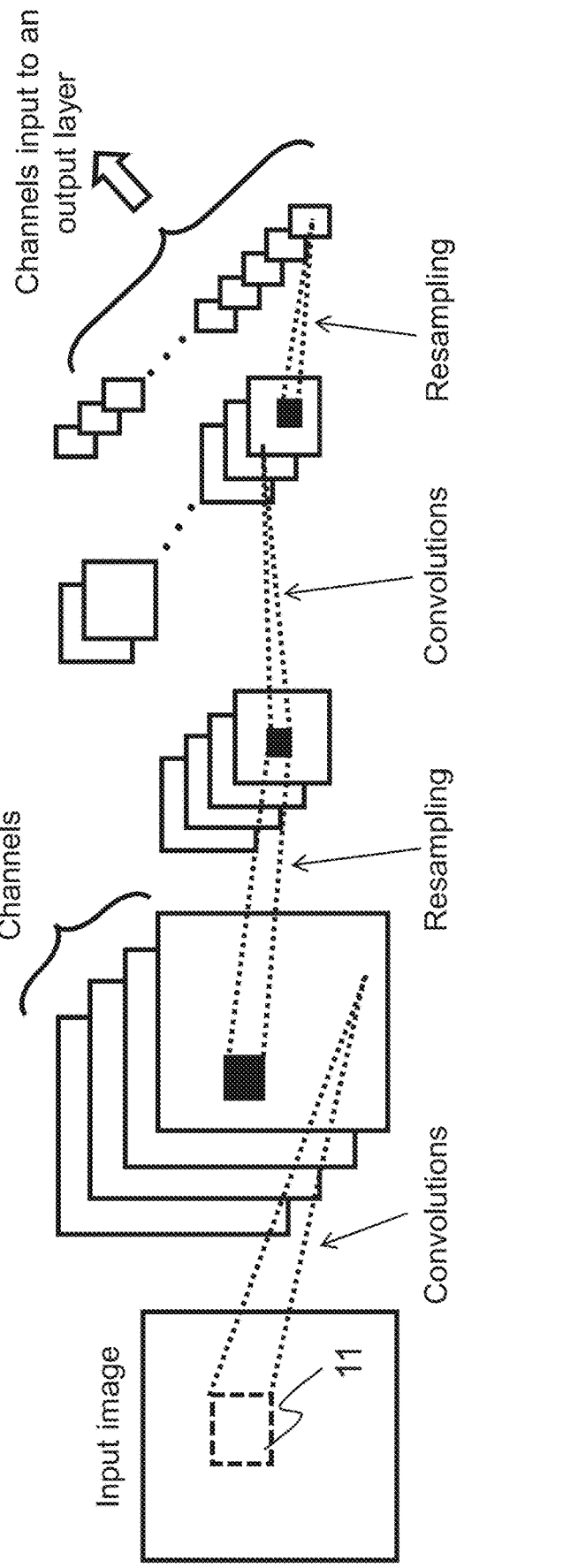
FIG. 1 is a schematic drawing illustrating channels processed by layers of a neural network.

In the following description, reference is made to the accompanying figures, which form part of the disclosure, and which show, by way of illustration, specific aspects of embodiments of the present disclosure or specific aspects in which embodiments of the present disclosure may be used. It is understood that embodiments of the present disclosure may be used in other aspects and comprise structural or logical changes not depicted in the figures. The following detailed description, therefore, is not to be taken in a limiting sense.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

In the following, an overview over some of the used technical terms and frameworks within which the embodiments of the present disclosure may be employed is provided.

Artificial Neural Networks

Artificial neural networks (ANN) or connectionist systems are computing systems vaguely inspired by the biological neural networks that constitute animal brains. Such systems "learn" to perform tasks by considering examples, generally without being programmed with task-specific rules. For example, in image recognition, they might learn to identify images that contain cats by analyzing example images that have been manually labeled as "cat" or "no cat" and to use the results to identify cats in other images. They do this without any prior knowledge of cats, for example, that they have furs, tails, whiskers and cat-like faces. Instead, they automatically generate identifying characteristics from the examples that they process.

An ANN is based on a collection of connected units or nodes called artificial neurons, which loosely model the neurons in a biological brain. Each connection, like the synapses in a biological brain, can transmit a signal to other neurons. An artificial neuron that receives a signal then processes it and can signal neurons connected to it.

In ANN implementations, the "signal" at a connection is a real number, and the output of each neuron is computed by some non-linear function of the sum of its inputs. The connections are called edges. Neurons and edges typically each have a weight that adjusts as learning proceeds. The weight increases or decreases the strength of the signal at a connection. Neurons may have thresholds such that a signal is sent only if the aggregate signal crosses that threshold. Typically, neurons are aggregated into layers. Different layers may perform different transformations on their inputs. Signals travel from the first layer (the input layer) to the last layer (the output layer), possibly after traversing the layers multiple times.

The original goal of the ANN approach was to solve problems in the same way that a human brain would. Over time, attention moved to performing specific tasks, leading to deviations from biology. ANNs have been used on a variety of tasks, including computer vision, speech recognition, machine translation, social network filtering, playing board and video games, medical diagnosis, and even in activities that have traditionally been considered as reserved to humans, like painting.

The name "convolutional neural network" (CNN) indicates that the network employs a mathematical operation called convolution. Convolution is a specialized kind of linear operation. Convolutional networks are neural networks that use convolution in place of a general matrix multiplication in at least one of their layers.

FIG. 1 schematically illustrates a general concept of processing by a neural network such as the CNN. A convolutional neural network consists of an input and an output layer, as well as multiple hidden layers. An input layer is the layer to which the input (such as a portion 11 of an input image as shown in FIG. 1) is provided for processing. The hidden layers of a CNN typically consist of a series of convolutional layers that convolve with a multiplication or other dot product. The output of a layer is one or more feature maps (illustrated by empty solid-line rectangles), sometimes also referred to as channels. There may be a resampling (such as subsampling) involved in the operation of some or all of the layers. As a consequence, the feature maps may become smaller, as illustrated in FIG. 1. It is noted that a convolution with a stride may also reduce the size (resample) of an input feature map. The activation function in a CNN is usually a ReLU (Rectified Linear Unit) layer, and is subsequently followed by additional convolutions such as pooling layers, fully connected layers and normalization layers, referred to as hidden layers because their inputs and outputs are masked by the activation function and final convolution. Though the layers are colloquially referred to as convolutional ones, this is only by convention. Mathematically, it is technically a sliding dot product or cross-correlation. This has significance for the indices in the matrix, in that it affects how the weight is determined at a specific index point.

When programming a CNN for processing images, as shown in FIG. 1, the input is a tensor with dimensions (number of images)×(image width)×(image height)×(image depth). It should be known that the image depth can be constituted by channels of an image. After passing through a convolutional layer, the image becomes abstracted to a feature map, with dimensions (number of images)×(feature map width)×(feature map height)×(feature map channels). A convolutional layer within a neural network should have the following attributes; Convolutional kernels defined by a width and height (hyper-parameters). The number of input channels and output channels (hyper-parameter). The depth of the convolution filter (the input channels) should be equal to the number channels (depth) of the input feature map.

In the past, traditional multilayer perceptron (MLP) models have been used for image recognition. However, due to the full connectivity between nodes, they suffered from high dimensionality, and did not scale well with higher resolution images. A 1000×1000-pixel image with RGB color channels has 3 million weights, which is too high to be feasibly processed efficiently at scale with full connectivity. Also, such network architecture does not take into account the spatial structure of data, treating input pixels which are far apart from each other in the same way as pixels that are close together. This ignores locality of reference in image data, both computationally and semantically. Thus, full connectivity of neurons is wasteful for purposes such as image recognition that are dominated by spatially local input patterns.

Convolutional neural networks are biologically inspired variants of multilayer perceptrons that are specifically designed to emulate the behavior of a visual cortex. These models mitigate the challenges posed by the MLP architecture by exploiting the strong spatially local correlation present in natural images. The convolutional layer is the core building block of a CNN. The layer's parameters consist of a set of learnable filters (the above-mentioned kernels), which have a small receptive field, but extend through the full depth of the input volume. During the forward pass, each filter is convolved across the width and height of the input volume, computing the dot product between the entries of the filter and the input and producing a 2-dimensional activation map of that filter. As a result, the network learns filters that activate when they detect some specific type of feature at some spatial position in the input.

Stacking the activation maps for all filters along the depth dimension forms the full output volume of the convolution layer. Every entry in the output volume can thus also be interpreted as an output of a neuron that looks at a small region in the input and shares parameters with neurons in the same activation map. A feature map, or activation map, is the output activations for a given filter. Feature map and activation has same meaning. In some papers it is called an activation map because it is a mapping that corresponds to the activation of different parts of the image, and also a feature map because it is also a mapping of where a certain kind of feature is found in the image. A high activation means that a certain feature was found.

Another important concept of CNNs is pooling, which is a form of non-linear down-sampling. There are several non-linear functions to implement pooling among which max pooling is the most common. It partitions the input image into a set of non-overlapping rectangles and, for each such sub-region, outputs the maximum.

Intuitively, the exact location of a feature is less important than its rough location relative to other features. This is the idea behind the use of pooling in convolutional neural networks. The pooling layer serves to progressively reduce the spatial size of the representation, to reduce the number of parameters, memory footprint and amount of computation in the network, and hence to also control overfitting. It is common to periodically insert a pooling layer between successive convolutional layers in a CNN architecture. The pooling operation provides another form of translation invariance.

The pooling layer operates independently on every depth slice of the input and resizes it spatially. The most common form is a pooling layer with filters of size 2×2 applied with a stride of 2 at every depth slice in the input by 2 along both width and height, discarding 75% of the activations. In this case, every max operation is over 4 numbers. The depth dimension remains unchanged. In addition to max pooling, pooling units can use other functions, such as average pooling or $\ell 2$-norm pooling. Average pooling was often used historically but has recently fallen out of favor compared to max pooling, which often performs better in practice. Due to the aggressive reduction in the size of the representation, there is a recent trend towards using smaller filters or discarding pooling layers altogether. "Region of Interest" pooling (also known as ROI pooling) is a variant of max pooling, in which an output size is fixed and an input rectangle is a parameter. Pooling is an important component of convolutional neural networks for object detection based on Fast R-CNN architecture.

The above-mentioned ReLU is the abbreviation of rectified linear unit, which applies the non-saturating activation function. It effectively removes negative values from an activation map by setting them to zero. It increases the nonlinear properties of the decision function and of the overall network without affecting the receptive fields of the convolution layer. Other functions are also used to increase nonlinearity, for example the saturating hyperbolic tangent and the sigmoid function. ReLU is often preferred to other functions because it trains the neural network several times faster without a significant penalty to generalization accuracy.

After several convolutional and max pooling layers, the high-level reasoning in the neural network is done via fully connected layers. Neurons in a fully connected layer have connections to all activations in the previous layer, as seen in regular (non-convolutional) artificial neural networks. Their activations can thus be computed as an affine transformation, with matrix multiplication followed by a bias offset (vector addition of a learned or fixed bias term).

The "loss layer" (including calculating of a loss function) specifies how training penalizes the deviation between the predicted (output) and true labels and is normally the final layer of a neural network. Various loss functions appropriate for different tasks may be used. Softmax loss is used for predicting a single class of K mutually exclusive classes. Sigmoid cross-entropy loss is used for predicting K independent probability values in [0, 1]. Euclidean loss is used for regressing to real-valued labels.

In summary, FIG. 1 shows the data flow in a typical convolutional neural network. First, the input image is passed through convolutional layers and becomes abstracted to a feature map comprising several channels, corresponding to a number of filters in a set of learnable filters of this layer. Then, the feature map is subsampled using e.g. a pooling layer, which reduces the dimension of each channel in the feature map. Next, the data comes to another convolutional layer, which may have different numbers of output channels. As was mentioned above, the number of input channels and output channels are hyper-parameters of the layer. To establish connectivity of the network, those parameters need to be synchronized between two connected layers, such that the number of input channels for the current layers should be equal to the number of output channels of the previous layer. For the first layer which processes input data, e.g. an image, the number of input channels is normally equal to the number of channels of data representation, for instance 3 channels for RGB or YUV representation of images or video, or 1 channel for grayscale image or video representation. The channels obtained by one or more convolutional layers (and possibly resampling layer(s)) may be passed to an output layer. Such output layer may be a convolutional or resampling in some implementations. In an exemplary and non-limiting implementation, the output layer is a fully connected layer.

Autoencoders and Unsupervised Learning

Figure 2:
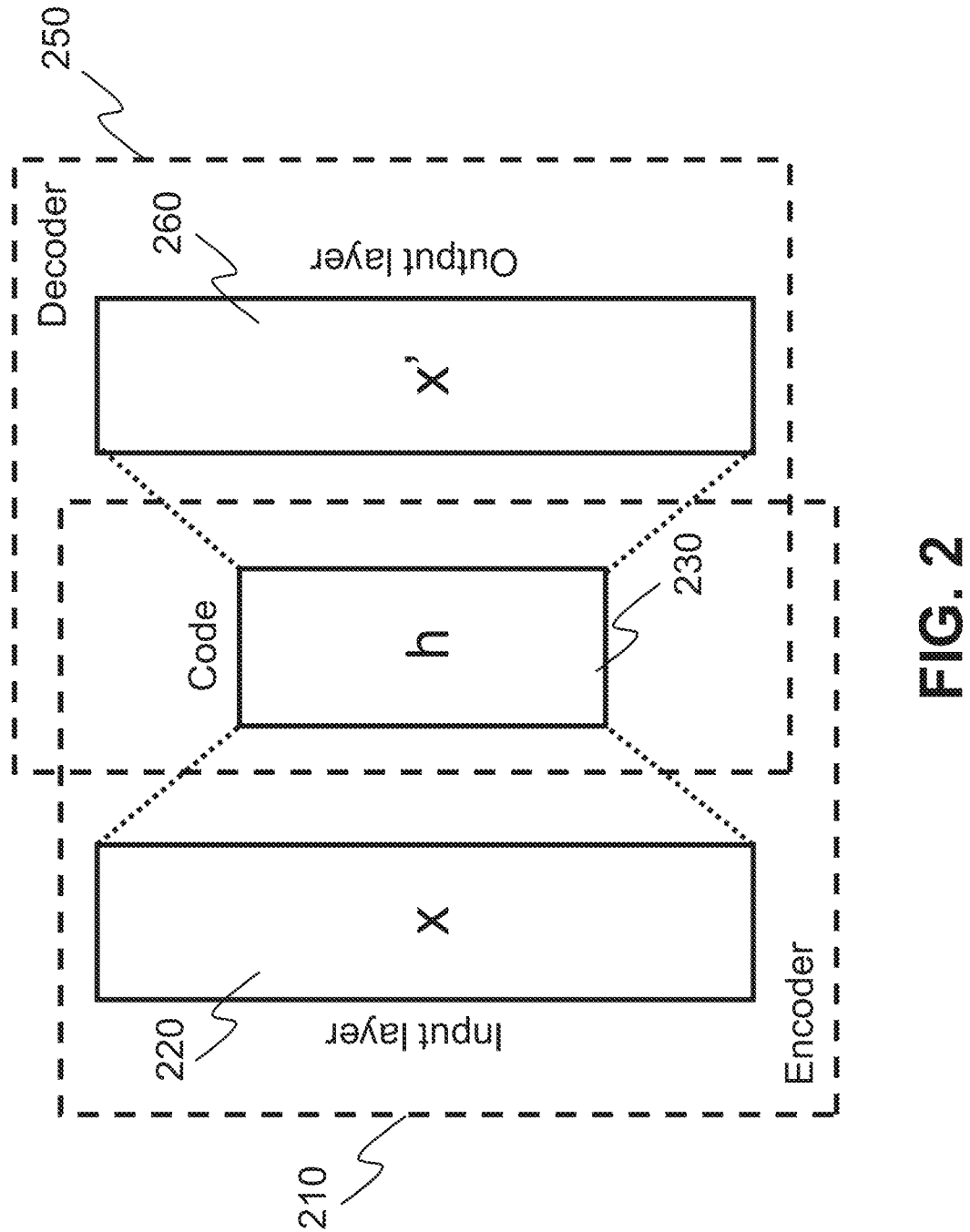
FIG. 2 is a schematic drawing illustrating an autoencoder type of a neural network.

An autoencoder is a type of artificial neural network used to learn efficient data codings in an unsupervised manner. A schematic drawing thereof is shown in FIG. 2. The autoencoder includes an encoder side 210 with an input x inputted into an input layer of an encoder subnetwork 220 and a decoder side 250 with output x' outputted from a decoder subnetwork 260. The aim of an autoencoder is to learn a representation (encoding) 230 for a set of data x, typically for dimensionality reduction, by training the network 220, 260 to ignore signal "noise". Along with the reduction (encoder) side subnetwork 220, a reconstructing (decoder) side subnetwork 260 is learnt, where the autoencoder tries to generate from the reduced encoding 230 a representation x' as close as possible to its original input x, hence its name. In the simplest case, given one hidden layer, the encoder stage of an autoencoder takes the input x and maps it to h $$h = \sigma(Wx + b).$$

This image h is usually referred to as code 230, latent variables, or latent representation. Here, σ is an element-wise activation function such as a sigmoid function or a rectified linear unit. W is a weight matrix b is a bias vector. Weights and biases are usually initialized randomly, and then updated iteratively during training through Backpropagation. After that, the decoder stage of the autoencoder maps h to the reconstruction x' of the same shape as x:

$$x' = \sigma'(W'h' + b')$$

where σ', W' and b' for the decoder may be unrelated to the corresponding σ, W and b for the encoder.

Variational autoencoder models make strong assumptions concerning the distribution of latent variables. They use a variational approach for latent representation learning, which results in an additional loss component and a specific estimator for the training algorithm called the Stochastic Gradient Variational Bayes (SGVB) estimator. It assumes that the data is generated by a directed graphical model $p_\theta(x|h)$ and that the encoder is learning an approximation $q_\phi(h|x)$ to the posterior distribution $p_\theta(h|x)$ where $\phi$ and $\theta$ denote the parameters of the encoder (recognition model) and decoder (generative model) respectively. The probability distribution of the latent vector of a VAE typically matches that of the training data much closer than a standard autoencoder. The objective of VAE has the following form:

$$\mathcal{L}(\phi, \theta, x) = D_{KL}(q_\phi(h\,|\,x)\|p_\theta(h)) - E_{q_\phi(h|x)}(\log p_\theta(x\,|\,h))$$

Here, $D_{KL}$ stands for the Kullback-Leibler divergence. The prior over the latent variables is usually set to be the centered isotropic multivariate Gaussian $p_\theta(h) = \mathcal{N}(0,I)$. Commonly, the shape of the variational and the likelihood distributions are chosen such that they are factorized Gaussians:

$$q_\phi(h|x) = \mathcal{N}\left(\rho(x),\, \omega^2(x)I\right)$$

$$p_\phi(x|h) = \mathcal{N}\left(\mu(h),\, \sigma^2(h)I\right)$$

where $\rho(x)$ and $\omega^2(x)$ are the encoder output, while $\mu(h)$ and $\sigma^2(h)$ are the decoder outputs.

Recent progress in artificial neural networks area and especially in convolutional neural networks enables researchers' interest of applying neural networks based technologies to the task of image and video compression. For example, End-to-end Optimized Image Compression has been proposed, which uses a network based on a variational autoencoder.

Accordingly, data compression is considered as a fundamental and well-studied problem in engineering, and is commonly formulated with the goal of designing codes for a given discrete data ensemble with minimal entropy. The solution relies heavily on knowledge of the probabilistic structure of the data, and thus the problem is closely related to probabilistic source modeling. However, since all practical codes must have finite entropy, continuous-valued data (such as vectors of image pixel intensities) must be quantized to a finite set of discrete values, which introduces an error.

In this context, known as the lossy compression problem, one must trade off two competing costs: the entropy of the discretized representation (rate) and the error arising from the quantization (distortion). Different compression applications, such as data storage or transmission over limited-capacity channels, demand different rate-distortion trade-offs.

Joint optimization of rate and distortion is difficult. Without further constraints, the general problem of optimal quantization in high-dimensional spaces is intractable. For this reason, most existing image compression methods operate by linearly transforming the data vector into a suitable continuous-valued representation, quantizing its elements independently, and then encoding the resulting discrete representation using a lossless entropy code. This scheme is called transform coding due to the central role of the transformation.

For example, JPEG uses a discrete cosine transform on blocks of pixels, and JPEG 2000 uses a multi-scale orthogonal wavelet decomposition. Typically, the three components of transform coding methods-transform, quantizer, and entropy code—are separately optimized (often through manual parameter adjustment). Modern video compression standards like HEVC, VVC and EVC also use transformed representations to code a residual signal after prediction. Several transforms are used for that purpose such as discrete cosine and sine transforms (DCT, DST), as well as low frequency non-separable manually optimized transforms (LFNST).

Variational Image Compression

Variable Auto-Encoder (VAE) framework can be considered as a nonlinear transforming coding model. The transforming process can be mainly divided into four parts. This is exemplified in FIG. 3A showing a VAE framework.

The transforming process can be mainly divided into four parts: FIG. 3A exemplifies the VAE framework. In FIG. 3A, the encoder 101 maps an input image x into a latent representation (denoted by y) via the function y=ƒ(x). This latent representation may also be referred to as a part of or a point within a "latent space" in the following. The function f( ) is a transformation function that converts the input signal x into a more compressible representation y. The quantizer 102 transforms the latent representation y into the quantized latent representation ŷ with (discrete) values by ŷ=Q(y), with Q representing the quantizer function. The entropy model, or the hyper encoder/decoder (also known as hyper-prior) 103 estimates the distribution of the quantized latent representation ŷ to get the minimum rate achievable with a lossless entropy source coding.

The latent space can be understood as a representation of compressed data in which similar data points are closer together in the latent space. Latent space is useful for learning data features and for finding simpler representations of data for analysis. The quantized latent representation T, ŷ and the side information ẑ of the hyperprior 3 are included into a bitstream 2 (are binarized) using arithmetic coding (AE). Furthermore, a decoder 104 is provided that transforms the quantized latent representation to the reconstructed image x̂, x̂=g(ŷ). The signal x̂ is the estimation of the input image x. It is desirable that x is as close to x̂ as possible, in other words the reconstruction quality is as high as possible. However, the higher the similarity between x̂ and x, the higher the amount of side information necessary to be transmitted. The side information includes bitstream 1 and bitstream 2 shown in FIG. 3A, which are generated by the encoder and transmitted to the decoder. Normally, the higher the amount of side information, the higher the reconstruction quality. However, a high amount of side information means that the compression ratio is low. Therefore, one purpose of the system described in FIG. 3A is to balance the reconstruction quality and the amount of side information conveyed in the bitstream.

Figure 3A:
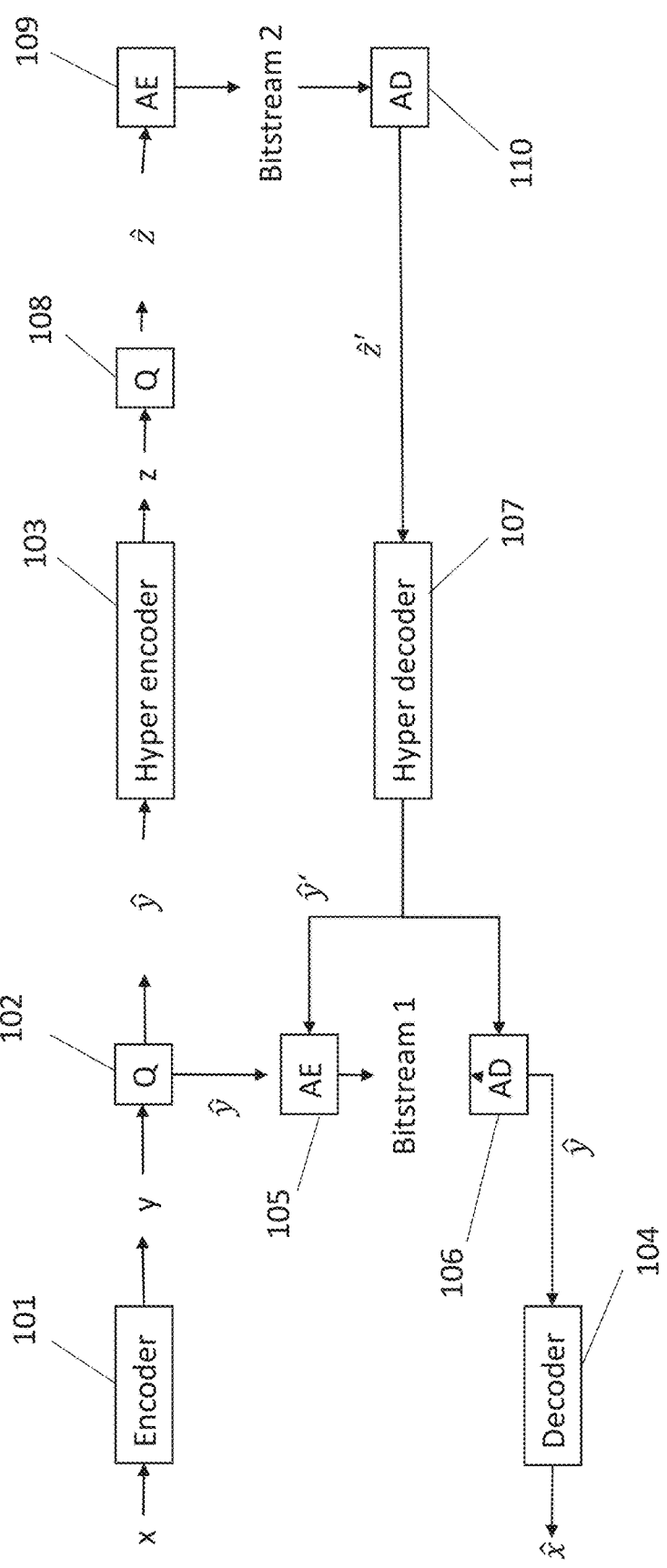
FIG. 3A is a schematic drawing illustrating an exemplary network architecture wherein an encoder and a decoder side include a hyperprior model.

In FIG. 3A the component AE 105 is the Arithmetic Encoding module, which converts samples of the quantized latent representation $\hat{y}$ and the side information $\hat{z}$ into a binary representation bitstream 1. The samples of $\hat{y}$ and $\hat{z}$ might, for example, comprise integer or floating point numbers. One purpose of the arithmetic encoding module is to convert (via the process of binarization) the sample values into a string of binary digits (which is then included in the bitstream that may comprise further portions corresponding to the encoded image or further side information).

The arithmetic decoding (AD) 106 is the process of reverting the binarization process, where binary digits are converted back to sample values. The arithmetic decoding is provided by the arithmetic decoding module 106.

It is noted that the present disclosure is not limited to this particular framework. Moreover, the present disclosure is not restricted to image or video compression, and can be applied to object detection, image generation, and recognition systems as well.

In FIG. 3A there are two sub networks concatenated to each other. A subnetwork in this context is a logical division between the parts of the total network. For example, in FIG. 3A the modules 101, 102, 104, 105 and 106 are called the "Encoder/Decoder" subnetwork. The "Encoder/Decoder" subnetwork is responsible for encoding (generating) and decoding (parsing) of the first bitstream "bitstream 1". The second network in FIG. 3A comprises modules 103, 108, 109, 110 and 107 and is called "hyper encoder/decoder" subnetwork. The second subnetwork is responsible for generating the second bitstream "bitstream 2". The purposes of the two subnetworks are different.

The first subnetwork is responsible for:
  the transformation 101 of the input image x into its latent representation y (which is easier to compress that x),
  quantizing 102 the latent representation y into a quantized latent representation $\hat{y}$.
  compressing the quantized latent representation $\hat{y}$ using the AE by the arithmetic encoding module 105 to obtain bitstream "bitstream 1",".
  parsing the bitstream 1 via AD using the arithmetic decoding module 106, and
  reconstructing 104 the reconstructed image ($\hat{x}$) using the parsed data.

The purpose of the second subnetwork is to obtain statistical properties (e.g. mean value, variance and correlations between samples of bitstream 1) of the samples of "bitstream 1", such that the compressing of bitstream 1 by first subnetwork is more efficient. The second subnetwork generates a second bitstream "bitstream 2", which comprises said information (e.g. mean value, variance and correlations between samples of bitstream 1).

The second network includes an encoding part which comprises transforming 103 of the quantized latent representation $\hat{y}$ into side information z, quantizing the side information z into quantized side information $\hat{z}$, and encoding (e.g. binarizing) 109 the quantized side information $\hat{z}$ into bitstream 2. In this example, the binarization is performed by an arithmetic encoding (AE). A decoding part of the second network includes arithmetic decoding (AD) 110, which transforms the input bitstream 2 into decoded quantized side information $\hat{z}'$. The $\hat{z}'$ might be identical to $\hat{z}$, since the arithmetic encoding end decoding operations are lossless compression methods. The decoded quantized side information $\hat{z}'$ is then transformed 107 into decoded side information $\hat{y}'$. $\hat{y}'$ represents the statistical properties of $\hat{y}$ (e.g. mean value of samples of $\hat{y}$, or the variance of sample values or like). The decoded latent representation $\hat{y}'$ is then provided to the above-mentioned Arithmetic Encoder 105 and Arithmetic Decoder 106 to control the probability model of $\hat{y}$.

The FIG. 3A describes an example of VAE (variational auto encoder), details of which might be different in different implementations. For example in a specific implementation additional components might be present to more efficiently obtain the statistical properties of the samples of bitstream 1. In one such implementation a context modeler might be present, which targets extracting cross-correlation information of the bitstream 1. The statistical information provided by the second subnetwork might be used by AE (arithmetic encoder) 105 and AD (arithmetic decoder) 106 components.

FIG. 3A depicts the encoder and decoder in a single figure. As is clear to those skilled in the art, the encoder and the decoder may be, and very often are, embedded in mutually different devices.

Figures 3B, 3C:
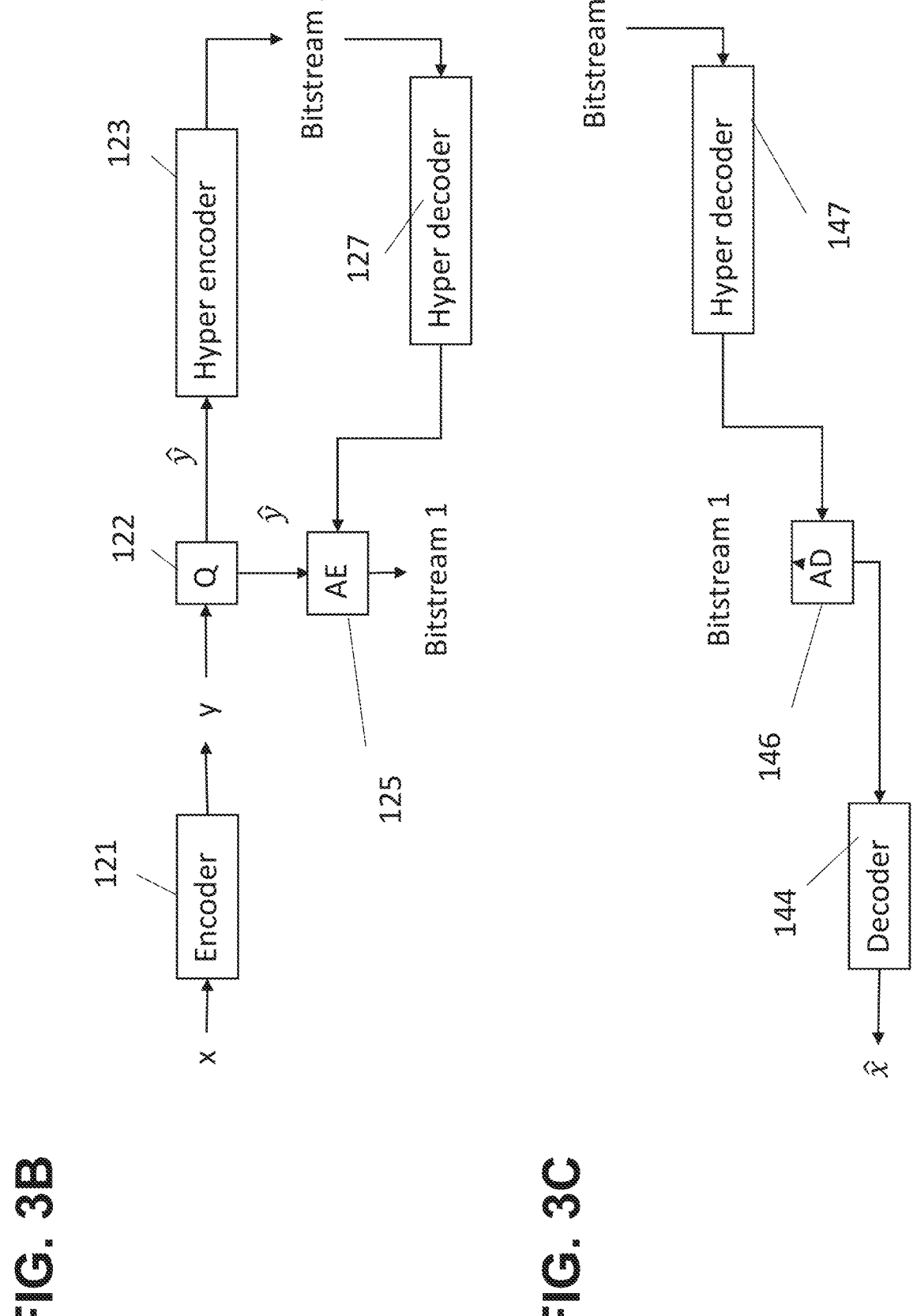
FIG. 3B is a schematic drawing illustrating a general network architecture wherein an encoder side includes a hyperprior model.
FIG. 3C is a schematic drawing illustrating a general network architecture wherein a decoder side includes a hyperprior model.

FIG. 3B depicts the encoder and FIG. 3C depicts the decoder components of the VAE framework in isolation. As input, the encoder receives, according to some embodiments, a picture. The input picture may include one or more channels, such as color channels or other kind of channels. e.g. depth channel or motion information channel, or the like. The output of the encoder (as shown in FIG. 3B) is a bitstream1 and a bitstream2. The bitstream1 is the output of the first sub-network of the encoder and the bitstream2 is the output of the second subnetwork of the encoder.

Similarly, in FIG. 3C, the two bitstreams, bitstream1 and bitstream2, are received as input and $\hat{z}$, which is the reconstructed (decoded) image, is generated at the output. As indicated above, the VAE can be split into different logical units that perform different actions. This is exemplified in FIGS. 3B and 3C so that FIG. 3B depicts components that participate in the encoding of a signal, like a video and provided encoded information. This encoded information is then received by the decoder components depicted in FIG. 3C for decoding, for example. It is noted that the components of the encoder and decoder denoted with numerals 12$x$ and 14$x$ may correspond in their functions to the components referred to above in FIG. 3A and denoted with numerals 10$x$.

Specifically, as is seen in FIG. 3B, the encoder comprises the encoder 121 that transforms an input x into a signal y which is then provided to the quantizer 322. The quantizer 122 provides information to the arithmetic encoding module 125 and the hyper encoder 123. The hyper encoder 123 provides the bitstream2 already discussed above to the hyper decoder 147 that in turn provides the information to the arithmetic encoding module 105 (125).

The output of the arithmetic encoding module is the bitstream 1. The bitstream 1 and bitstream 2 are the output of the encoding of the signal, which are then provided (transmitted) to the decoding process. Although the unit 101 (121) is called "encoder", it is also possible to call the complete subnetwork described in FIG. 3B as "encoder". Encoder in general means the unit (module) that converts an input to an encoded (e.g. compressed) output. It can be seen from FIG. 3B, that the unit 121 can be actually considered as a core of the whole subnetwork, since it performs the conversion of the input x into y, which is the compressed version of the x. The compression in the encoder 121 may be achieved. e.g. by applying a neural network, or in general any processing network with one or more layers. In such network, the compression may be performed by cascaded processing including downsampling which reduces size and/or number of channels of the input. Thus, the encoder may be referred to, e.g. as a neural network (NN) based encoder, or the like.

The remaining parts in the figure (quantization unit, hyper encoder, hyper decoder, arithmetic encoder/decoder) are all parts that either improve the efficiency of the encoding process or are responsible for converting the compressed output y into a series of bits (bitstream). Quantization may be provided to further compress the output of the NN encoder 121 by a lossy compression. The AE 125 in combination with the hyper encoder 123 and hyper decoder 127 used to configure the AE 125 may perform the binarization which may further compress the quantized signal by a lossless compression. Therefore, it is also possible to call the whole subnetwork in FIG. 3B an "encoder".

A majority of Deep Learning (DL) based image/video compression systems reduce dimensionality of the signal before converting the signal into binary digits (bits). In the VAE framework for example, the encoder, which is a non-linear transform, maps the input image x into y, where y has a smaller width and height than x. Since the y has a smaller width and height, hence a smaller size, the (size of the) dimension of the signal is reduced, and, hence, it is easier to compress the signal y. It is noted that in general, the encoder does not necessarily need to reduce the size in both (or in general all) dimensions. Rather, some exemplary implementations may provide an encoder which reduces size only in one (or in general a subset of) dimension.

In J. Balle, L. Valero Laparra, and E. P. Simoncelli (2015). "Density Modeling of Images Using a Generalized Normalization Transformation", In: arXiv e-prints, Presented at the 4th Int. Conf. for Learning Representations, 2016 (referred to in the following as "Balle") the authors proposed a framework for end-to-end optimization of an image compression model based on nonlinear transforms. The authors optimize for Mean Squared Error (MSE), but use a more flexible transforms built from cascades of linear convolutions and nonlinearities. Specifically, the authors use a generalized divisive normalization (GDN) joint nonlinearity that is inspired by models of neurons in biological visual systems, and has proven effective in Gaussianizing image densities. This cascaded transformation is followed by uniform scalar quantization (i.e., each element is rounded to the nearest integer), which effectively implements a parametric form of vector quantization on the original image space. The compressed image is reconstructed from these quantized values using an approximate parametric nonlinear inverse transform.

Figure 4:
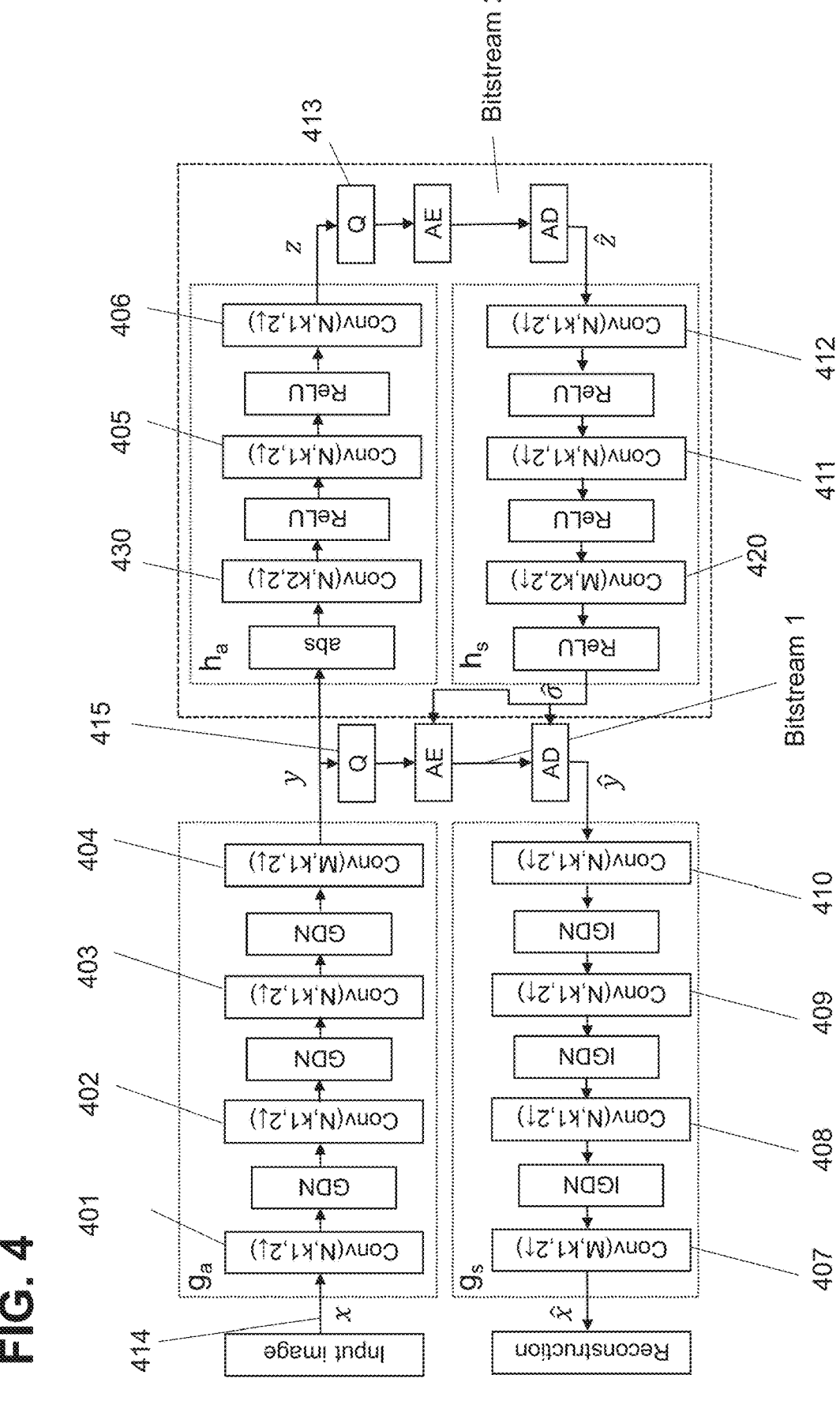
FIG. 4 is a schematic drawing illustrating an exemplary network architecture wherein an encoder and a decoder side include a hyperprior model.

Such an example of the VAE framework is shown in FIG. 4, and it utilizes 6 downsampling layers that are marked with 401 to 406. The network architecture includes a hyperprior model. The left side ($g_a$, $g_s$) shows an image autoencoder architecture, the right side ($h_a$, $h_s$) corresponds to the autoencoder implementing the hyperprior. The factorized-prior model uses the identical architecture for the analysis and synthesis transforms $g_a$ and $g_s$. Q represents quantization, and AE and AD represent arithmetic encoder and arithmetic decoder, respectively. The encoder subjects the input image x to $g_a$, yielding the responses y (latent representation) with spatially varying standard deviations. The encoding $g_a$ includes a plurality of convolution layers with subsampling and, as an activation function, generalized divisive normalization (GDN).

The responses are fed into $h_a$, summarizing the distribution of standard deviations in z, z is then quantized, compressed, and transmitted as side information. The encoder then uses the quantized vector $\hat{z}$ to estimate $\hat{\sigma}$, the spatial distribution of standard deviations which is used for obtaining probability values (or frequency values) for arithmetic coding (AE), and uses it to compress and transmit the quantized image representation $\hat{y}$ (or latent representation). The decoder first recovers $\hat{z}$ from the compressed signal. It then uses $h_s$ to obtain $\hat{y}$, which provides it with the correct probability estimates to successfully recover y as well. It then feeds $\hat{y}$ into $g_s$ to obtain the reconstructed image.

The layers that include downsampling are indicated with the downward arrow in the layer description. The layer description "Conv N,k1,2↓" means that the layer is a convolution layer, with N channels and the convolution kernel is k1×k1 in size. For example, k1 may be equal to 5 and k2 may be equal to 3. As stated, the 2↓ means that a downsampling with a factor of 2 is performed in this layer. Downsampling by a factor of 2 results in one of the dimensions of the input signal being reduced by half at the output. In FIG. 4, the 2↓ indicates that both width and height of the input image is reduced by a factor of 2. Since there are 6 downsampling layers, if the width and height of the input image 414 (also denoted with x) is given by w and h, the output signal $\hat{z}$ 413 is has width and height equal to w/64 and h/64 respectively. Modules denoted by AE and AD are arithmetic encoder and arithmetic decoder, which are explained with reference to FIGS. 3A to 3C. The arithmetic encoder and decoder are specific implementations of entropy coding. AE and AD can be replaced by other means of entropy coding. In information theory, an entropy encoding is a lossless data compression scheme that is used to convert the values of a symbol into a binary representation which is a revertible process. Also, the "Q" in the figure corresponds to the quantization operation that was also referred to above in relation to FIG. 4 and is further explained above in the section "Quantization". Also, the quantization operation and a corresponding quantization unit as part of the component 413 or 415 is not necessarily present and/or can be replaced with another unit.

In FIG. 4, there is also shown the decoder comprising upsampling layers 407 to 412. A further layer 420 is provided between the upsampling layers 411 and 410 in the processing order of an input that is implemented as convolutional layer but does not provide an upsampling to the input received. A corresponding convolutional layer 430 is also shown for the decoder. Such layers can be provided in NNs for performing operations on the input that do not alter the size of the input but change specific characteristics. However, it is not necessary that such a layer is provided.

When seen in the processing order of bitstream 2 through the decoder, the upsampling layers are run through in reverse order, i.e. from upsampling layer 412 to upsampling layer 407. Each upsampling layer is shown here to provide an upsampling with an upsampling ratio of 2, which is indicated by the ↑. It is, of course, not necessarily the case that all upsampling layers have the same upsampling ratio and also other upsampling ratios like 3, 4, 8 or the like may be used. The layers 407 to 412 are implemented as convolutional layers (conv). Specifically, as they may be intended to provide an operation on the input that is reverse to that of the encoder, the upsampling layers may apply a deconvolution operation to the input received so that its size is increased by a factor corresponding to the upsampling ratio. However, the present disclosure is not generally limited to deconvolution and the upsampling may be performed in any other manner such as by bilinear interpolation between two neighboring samples, or by nearest neighbor sample copying, or the like.

In the first subnetwork, some convolutional layers (401 to 403) are followed by generalized divisive normalization (GDN) at the encoder side and by the inverse GDN (IGDN) at the decoder side. In the second subnetwork, the activation function applied is ReLU. It is noted that the present disclosure is not limited to such implementation and in general, other activation functions may be used instead of GDN or ReLU.

Cloud Solutions for Machine Tasks

Figure 5:
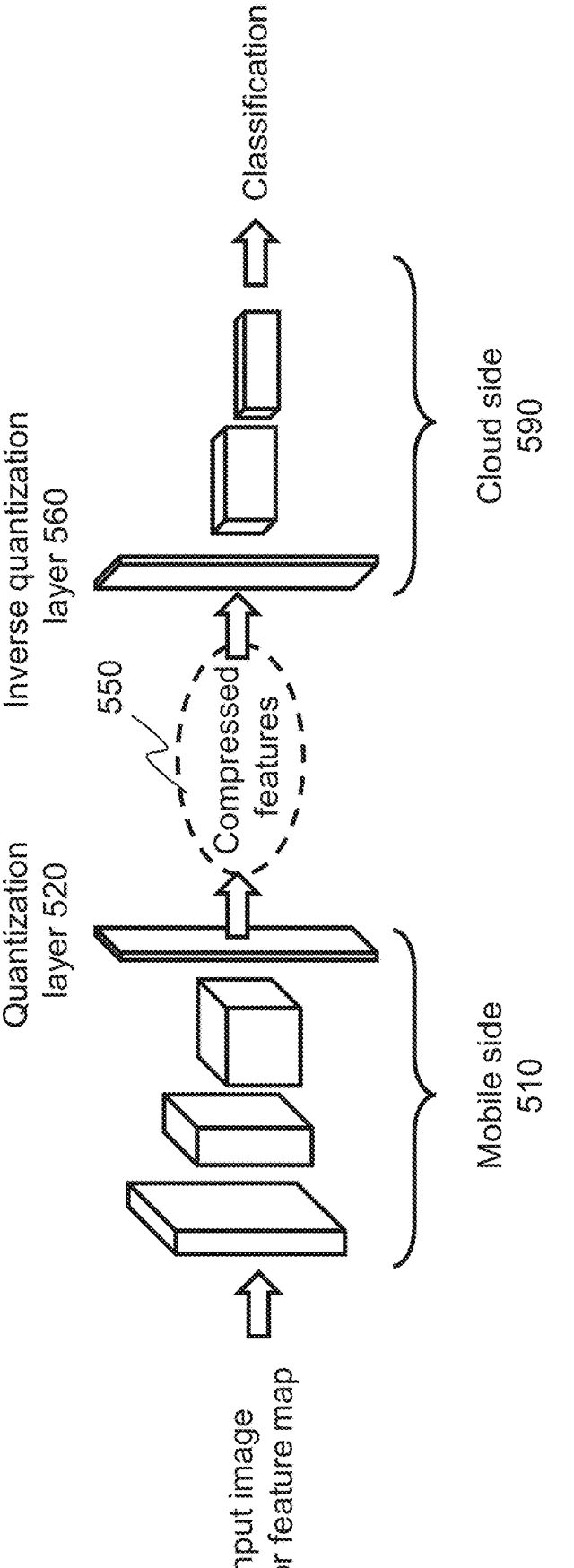
FIG. 5 is a block diagram illustrating a structure of a cloud-based solution for machine based tasks such as machine vision tasks.

The Video Coding for Machines (VCM) is another computer science direction being popular nowadays. The main idea behind this approach is to transmit a coded representation of image or video information targeted to further processing by computer vision (CV) algorithms, like object segmentation, detection and recognition. In contrast to traditional image and video coding targeted to human perception the quality characteristic is the performance of computer vision task, e.g. object detection accuracy, rather than reconstructed quality. This is illustrated in FIG. 5.

Video Coding for Machines is also referred to as collaborative intelligence and it is a relatively new paradigm for efficient deployment of deep neural networks across the mobile-cloud infrastructure. By dividing the network between the mobile side 510 and the cloud side 590 (e.g. a cloud server), it is possible to distribute the computational workload such that the overall energy and/or latency of the system is minimized. In general, the collaborative intelligence is a paradigm wherein processing of a neural network is distributed between two or more different computation nodes; for example devices, but in general, any functionally defined nodes. Here, the term "node" does not refer to the above-mentioned neural network nodes. Rather the (computation) nodes here refer to (physically or at least logically) separate devices/modules, which implement parts of the neural network. Such devices may be different servers, different end user devices, a mixture of servers and/or user devices and/or cloud and/or processor or the like. In other words, the computation nodes may be considered as nodes belonging to the same neural network and communicating with each other to convey coded data within/for the neural network. For example, in order to be able to perform complex computations, one or more layers may be executed on a first device (such as a device on mobile side 510) and one or more layers may be executed in another device (such as a cloud server on cloud side 590). However, the distribution may also be finer and a single layer may be executed on a plurality of devices. In this disclosure, the term "plurality" refers to two or more. In some existing solution, a part of a neural network functionality is executed in a device (user device or edge device or the like) or a plurality of such devices and then the output (feature map) is passed to a cloud. A cloud is a collection of processing or computing systems that are located outside the device, which is operating the part of the neural network. The notion of collaborative intelligence has been extended to model training as well. In this case, data flows both ways: from the cloud to the mobile during back-propagation in training, and from the mobile to the cloud (illustrated in FIG. 5) during forward passes in learning, as well as inference.

Some works presented semantic image compression by encoding deep features and then reconstructing the input image from them. The compression based on uniform quantization was shown, followed by context-based adaptive arithmetic coding (CABAC) from H.264. In some scenarios, it may be more efficient, to transmit from the mobile part 510 to the cloud 590 an output of a hidden layer (a deep feature map) 550), rather than sending compressed natural image data to the cloud and perform the object detection using reconstructed images. It may thus be advantageous to compress the data (features) generated by the mobile side 510, which may include a quantization layer 520 for this purpose. Correspondingly, the cloud side 590 may include an inverse quantization layer 560. The efficient compression of feature maps benefits the image and video compression and reconstruction both for human perception and for machine vision. Entropy coding methods. e.g. arithmetic coding is a popular approach to compression of deep features (i.e. feature maps).

Nowadays, video content contributes to more than 80% internet traffic, and the percentage is expected to increase even further. Therefore, it is critical to build an efficient video compression system and generate higher quality frames at given bandwidth budget. In addition, most video related computer vision tasks such as video object detection or video object tracking are sensitive to the quality of compressed videos, and efficient video compression may bring benefits for other computer vision tasks. Meanwhile, the techniques in video compression are also helpful for action recognition and model compression. However, in the past decades, video compression algorithms rely on handcrafted modules, e.g., block based motion estimation and Discrete Cosine Transform (DCT), to reduce the redundancies in the video sequences, as mentioned above. Although each module is well designed, the whole compression system is not end-to-end optimized. It is desirable to further improve video compression performance by jointly optimizing the whole compression system.

End-to-End Image or Video Compression

DNN based image compression methods can exploit large scale end-to-end training and highly non-linear transform, which are not used in the traditional approaches. However, it is non-trivial to directly apply these techniques to build an end-to-end learning system for video compression. First, it remains an open problem to learn how to generate and compress the motion information tailored for video compression. Video compression methods heavily rely on motion information to reduce temporal redundancy in video sequences.

A straightforward solution is to use the learning based optical flow to represent motion information. However, current learning based optical flow approaches aim at generating flow fields as accurate as possible. The precise optical flow is often not optimal for a particular video task. In addition, the data volume of optical flow increases significantly when compared with motion information in the traditional compression systems and directly applying the existing compression approaches to compress optical flow values will significantly increase the number of bits required for storing motion information. Second, it is unclear how to build a DNN based video compression system by minimizing the rate-distortion based objective for both residual and motion information. Rate-distortion optimization (RDO) aims at achieving higher quality of reconstructed frame (i.e., less distortion) when the number of bits (or bit rate) for compression is given. RDO is important for video compression performance. In order to exploit the power of end-to-end training for learning based compression system, the RDO strategy is required to optimize the whole system.

In Guo Lu, Wanli Ouyang, Dong Xu, Xiaoyun Zhang, Chunlei Cai, Zhiyong Gao; "*DVC: An End-to-end Deep*

35
36

*Video Compression Framework". Proceedings of the IEEE/ CVF Conference on Computer Vision and Pattern Recognition (CVPR)*, 2019, pp. 11006-11015, authors proposed the end-to-end deep video compression (DVC) model that jointly learns motion estimation, motion compression, and residual coding.

Figure 6:
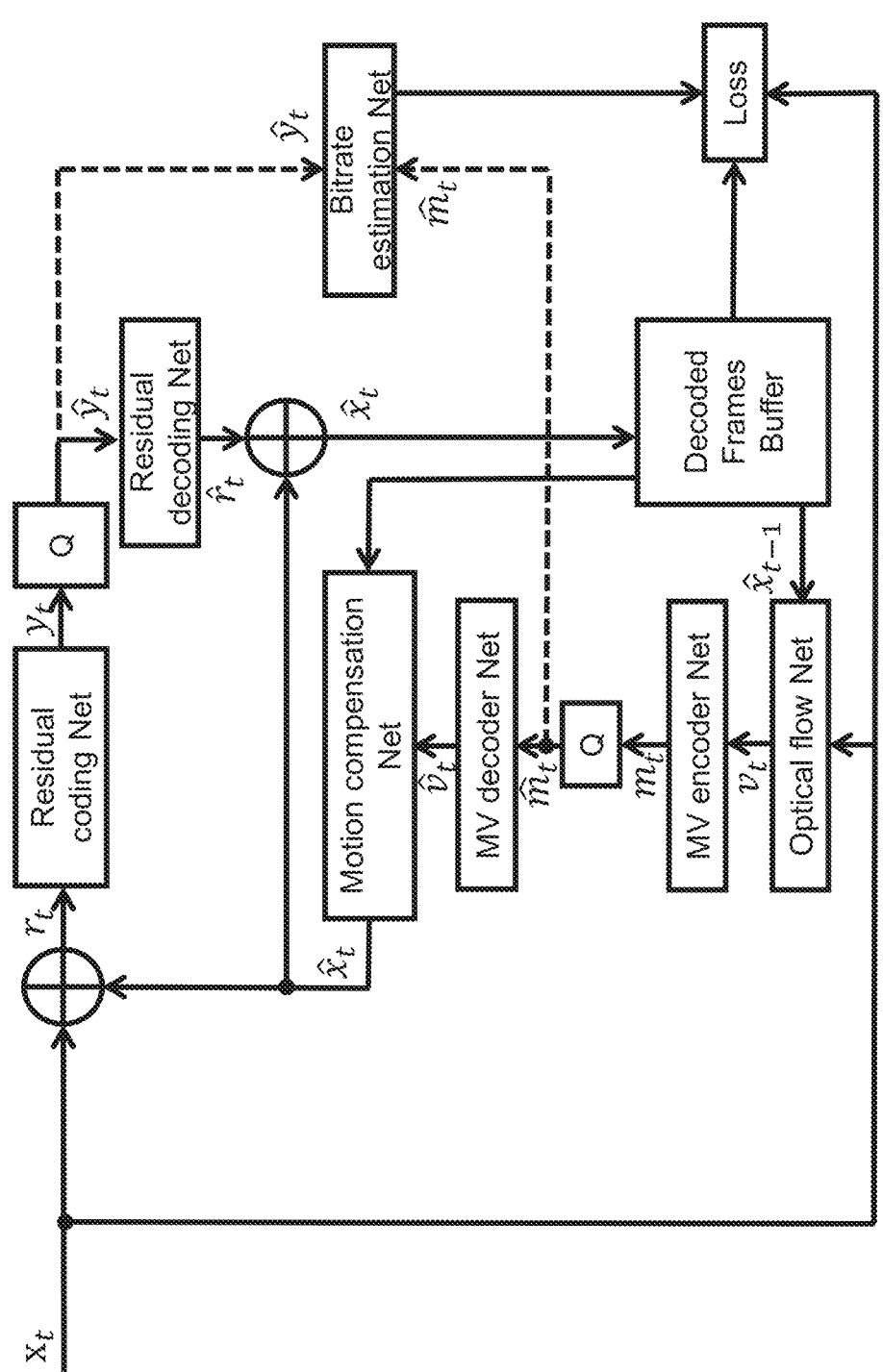
FIG. 6 is a block diagram illustrating end-to-end video compression framework based on a neural networks.

Such encoder is illustrated in FIG. 6. In particular, FIG. 6 shows an overall structure of end-to-end trainable video compression framework. In order to compress motion information, a CNN was designated to transform the optical flow $v_t$ to the corresponding representations $m_t$ suitable for better compression.

Transformers

Recently, transformers have attracted increasing attention both in the field of language processing (for example, text translation) and image processing. Video coding can be facilitated by the employment of transformer based neural networks. Transformer can be used for image enhancement and classification purposes. Transformers do not comprise recurrent or convolutional neural networks but rely on self-attention. Transformers may also be implemented in the configuration shown in FIG. 6, for example. In particular, transformers may be combined with recurrent or convolutional neural networks.

Figure 7:
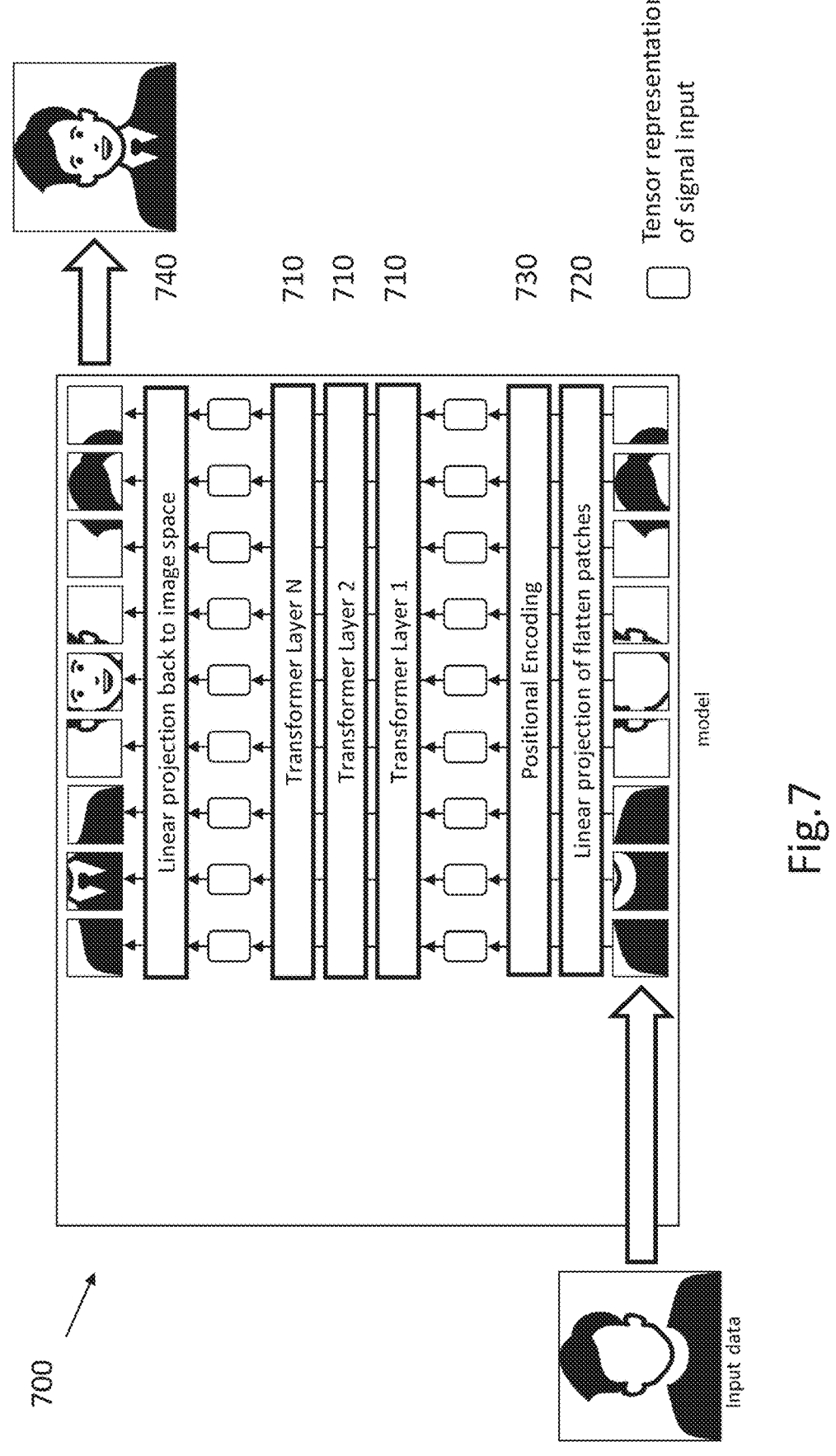
FIG. 7 illustrates a transformer.

FIG. 7 illustrates an example of a transformer 700. The transformer 700 comprises neural layers 810 (transformer layers). The transformer 700 may comprise an encoder-decoder architecture comprising encoder neural layers and decoder neural layers. Alternatively, the transformer 700 may comprise an encoder stack of neural layers only. Input data is input into the transformer and output data is output. For example, the transformer 700 is configured for image processing and may output an enhanced image. The input data may comprise patches of an image or words of a sentence, for example. For example, a tokenizer generates tokens in the form of patches from an image or words from a sentence to be processed. These tokens can be converted into (continuous valued) embeddings by some embedding algorithm. According to the example, shown in FIG. 7 a linear projection layer 720 converts the input patches into tensor representations (embeddings) of the portions of the object to processed (in latent space). These tensor representations of signal input are processed by the transformer 700. Provision of a positional encoding layer 730) provides information on positions of portions of an object to be processed (for example, an image or sentence) relative to each other, for example, positions of patches of an image or words of a sentence relative to each other. A sinusoidal function for the positional encoding may be used.

A final one of the neural layers 710 outputs output data tensors in latent space that are converted back to object space (for example, image or sentence space) by a linear back projection layer 740.

The processing by the neural layers (transformer layers) 710 is based on the concept of self-attention. Each of the neural layers 710 of the transformer 700 comprises a multi-head self-attention layer and a (fully connected) feed forward neural network. The self-attention layer helps the encoder stack to look at other portions of an object (for example, patches of an image or words) as it encodes a specific portion of an object (for example, a patch of an image or a word of a sentence). The outputs of the self-attention layer are fed to a feed-forward neural network. The decoder stack also has both those components and between them an additional "encoder-decoder") attention layer that helps the decoder stack to focus on relevant parts of the input data. Each portion of an object to be processed (for example, a patch of an image or a word of a sentence) in each position flows through its own path in the encoder. There are dependencies between these paths in the self-attention layer. The feed-forward layer does not have those dependencies, however, and, therefore, the various paths can be executed in parallel while flowing through the feed-forward layer.

In the multi-head self-attention layer of the encoder stack Query Q. Key K and Value V tensors and the self-attention $$\text{Attention}(Q, K, V) = \text{softmax}\left(\frac{QK^T}{\sqrt{d_k}}\right)V$$

are computed wherein $d_k$ denotes the dimension of the key tensor and the Softmax function provides the final attention weights as probability distribution.

Each sub-layer (self-attention attention layer and feed forward neural network) in each encoder and decoder layer has a residual connection around it and is followed by a normalization layer.

The output of the top encoder layer is transformed into a set of attention vectors K and V. These are to be used by each decoder layer in its "encoder-decoder attention" layer. The "encoder-decoder attention" layers operate similar to the multi-head self-attention layers of the encoder stack except that they create Query matrices from the respective layers below and take the Key and Value matrices from the output of the encoder stack.

The decoder stack outputs a vector of floats that is converted into portions of an object (for example, patches of an image or words of a sentence) by a final Linear layer (fully connected neural network) that outputs logits and is followed by a Softmax Layer that produces a highest probability output.

As it is described above employment of neural networks (for example, CNNs) is of growing importance in the field of image coding systems and, in fact, data compression systems in general, for example, in the context of image, video, audio, 3D-PCC, etc. compression based on neural networks.

In practice, neural networks in actual applications are implemented on a variety of platforms/devices that differ from each other with respect to the numerical architectures. For example, one device may be or comprise a CPU whereas another that is in data communication with the one being or comprising a CPU may be or comprise a GPU. Different platforms (as, for example, comprising a CPU on one device and a GPU on another one) usually deal differently with delicate integer and real number situations, particularly, floating point operations but also fixed point operations. One class of delicate real number situations are overflows of registers/memories used. There is no standardized handling of overflow situations and hardly can any generally followed procedure be imagined in this respect.

Integer overflow occurs when an arithmetic operation attempts to create a numeric value that is outside of the range that can be represented with a given number of digits-either higher than the maximum or lower than the minimum representable value. This situation can be processed differently for different compilers, devices (CPU, GPU) and so on. In order to achieve bitexact result of integer operations on different platforms integer overflows should be avoided. In this context, it is noted that obtaining bitexact results on different platforms is not critical for all processing applications. However, for some applications it is. For example, in the context of autoencoding, for example, variational autoencoder, as described above with reference to FIGS. 2 to 4, an entropy model for lossless data compression is to be used on the encoder side and the decoder/receiver side for modelling symbol probabilities for an arithmetic encoder and decoder, respectively. The encoder side and the decoder/receiver side may employ different kinds of platforms. It is crucial for the reliable reconstruction of an encoded image that the entropy model is applied in the identical manner on both sides. In fact, even small deviations of the entropy model used on the decoder/receiver side from the one used on the encoder side may lead to a complete breakdown of the image decoding/reconstruction process due to wrong symbol interpretation. For example, in the configuration illustrated in FIG. 4 the entropy model $\hat{\sigma}$ has to provided by the hyperprior on the arithmetic encoder AE on the encoder side as well as the arithmetic decoder AD on the decoder side. Bitexact application of the same entropy model is needed for a reliable image reconstruction. The problem of the wrong symbol interpretation due to deviations of the entropy model used on the decoder/receiver side from the one used on the encoder side arises not only for image coding systems, but for all compression systems which use arithmetic coding and neural networks in the entropy part.

Regarding real number operations one has to differentiate between fixed point arithmetic and floating point arithmetic. Fixed point arithmetic is an arithmetic representing fractional (non-integer) numbers by storing a fixed number of digits of their fractional part. In general, it is an integer arithmetic; to convert such a fixed-point value to a real one division by a scaling factor corresponding to number of bits used for the storing fractional part is used. Floating point arithmetic is an arithmetic that uses a representation of real numbers in the form: mantissa*base$^{exponent}$ where mantissa is an integer, base is an integer greater than or equal to two, and exponent is also an integer. The base is fixed and the mantissa-exponent pair represents a number. Employment of non-fixed exponents in comparison with fixed-point arithmetic allows to achieve a trade-off between dynamic range and precision. Basically, both for fixed point arithmetic and floating point arithmetic a real number is represented in a form mantissa*base$^{exponent}$ the only difference is that in the case of a fixed-point arithmetic both base and exponent are fixed, whereas in the case of a floating-point arithmetic only base is fixed, but the exponent is a part of number representation. Thus, for fixed-point arithmetic the precision (exponent) of the operation result does not depend on the precision of the arguments which means that, for example, the result of a summation not depends on the order of the summation (the operation is associative as usual integer summation if no overflow occurs). For floating-point arithmetic, on the other hand, the exponent is part of the number representation and it is calculated during an arithmetic operation based on the exponents of the arguments. This causes non-associative summation: for example, if lots of very small numbers are added one by one to a large one, the result will be equal to the large number because the impact of the relatively small numbers will be lost after rounding using the exponent of the large number. On the contrary, if small numbers will be added to each other first, the impact of adding each number will not be lost due to rounding and the resulting sum can be relatively large to be not fully lost after rounding with an exponent of the large number. So, fixed-point arithmetic summation is associative as far as there is no overflow wherein, in principle, floating-point arithmetic is non-associative, i.e., in general: $(A+B)+C \neq A+(B+C)$. Since the order of summations may be different on the encoder side and the decoder side or is even not fully pre-determined this poses a problem with respect to identical results to be achieved on both sides. Therefore, fixed point arithmetic may be preferred to floating point arithmetic. In the context of entropy coding based data compression in order to guarantee proper decoding within various platforms, especially in systems with massive parallelism, it might be preferred to avoid the usage of floating point arithmetic at least in the entropy part of an image coding net and to use fixed point arithmetic instead. The potential problem of different floating-point arithmetic implementation on different devices is solved in this case, because fixed point (integer) operations are much more portable. However, any overflow cannot be avoided by simply restricting to fixed point arithmetic. In order to guarantee bitexact behavior on different platforms, it is not enough just to use fixed-point arithmetic, but it is of importance to guarantee absence of integer overflow.

Figure 8:
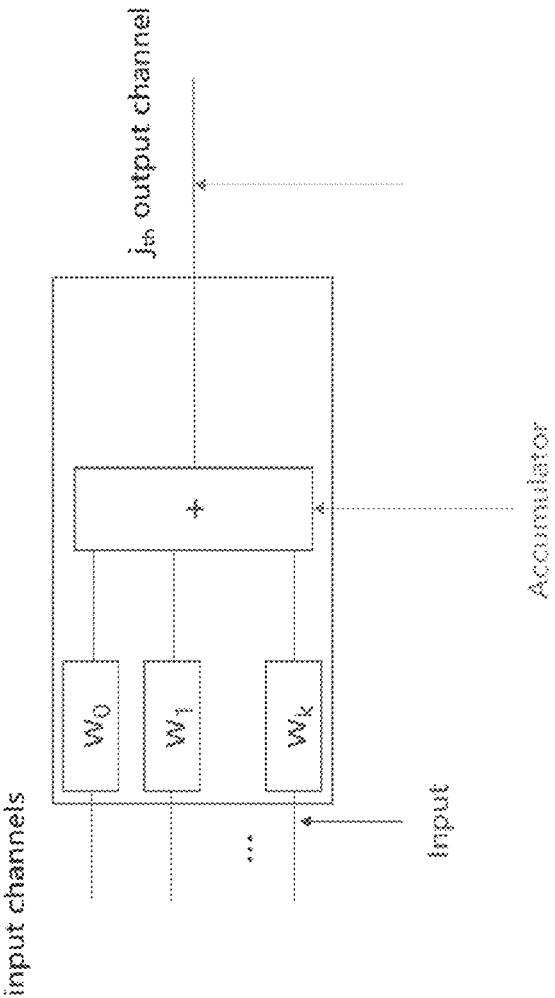
FIG. 8 illustrates a neural network layer.

In more detail, consider a neural network layer as it is illustrated in FIG. 8. The neural network layer may be comprised in a convolutional neural network or a fully connected neural network, for example. Data $x_i$ is input in different input channels and subject to the application of weights $w_{ij}$ (wherein the index i denotes an input channel of $C_{in}$ input channels and the index j denotes an output channel of $C_{out}$ channels). An output of the j-th channel is obtained according to:

$$\text{out}_j = \sum_{i=0}^{C_{in}-1} w_{ij}x_i + D, j = 0, \dots, C_{out} - 1 \qquad \text{(Equation 1)}$$

An accumulator register may be used for summation buffering.

The (usually trainable) bias D is ignored in the following for simplicity. For example, for a convolutional neural network layer the output in the j-th channel is given by $$\text{out}_j = \sum_{i=0}^{C_{in}-1} w_{ij} * x_i, j = 0, \dots, C_{out} - 1 \qquad \text{(Equation 2)}$$

with the convolution operator *. For a 1×1 kernel Equation 2 reduces to Equation 1.

An accumulator register of the neural network used for summation buffering has a pre-defined size, namely, some accumulator register bitdepth (size) n (for example, n=16 bits or 32 bits). To avoid integer overflow the following condition has, for example, to be fulfilled:

$$-2^{n-1} \leq \sum_{i=0}^{C_{in}-1} w_{ij}x_i \leq 2^{n-1} - 1 \qquad \text{Equation (3)}$$

A) Clipping and Scaling

According to an embodiment, for fixed point arithmetic to be used real numbers of input data $x_i$ to be processed by a neural network layer of a neural network (for example, a convolutional neural network) and real valued weights $w_{ij}$ of the neural network layer are converted into integers; and integer valued weights $\tilde{w}_{ij}$, respectively. The integerized version of Equation 2 reads $$\widetilde{out}_j = \frac{\sum_{i=0}^{C_{in}-1} \tilde{w}_{ij} * \tilde{x}_i}{2^{p+s_j}}, \; j = 0, \dots, C_{out} - 1 \qquad \text{Equation (4)}$$

wherein $\tilde{w}_{ij}=\text{round}(2^{s_j}w_{ij})$ and $\tilde{x}_i=\text{round}(2^p x_i)$ with $s_j$ denoting the number of bits for the fractional parts of the weights in the output channel j and p denoting the number of bits for fractional parts of the input data values. The round function rounds the argument to the closest integer value. The scaling factors $2^{s_j}$ and $2^p$ have not to be powers of 2 (this is an example only).

To avoid performance loss caused by such a conversion to fixed-point arithmetic, $e_j = |out_j - \widetilde{out}_j|$ should be minimized. The value of $e_j$ will obviously decrease with increasing precisions p and $s_j$ but at the same time the value of the sum $$\sum_{i=0}^{C_{in}-1} \tilde{w}_{ij} * \tilde{x}_i$$

will increase which might cause integer overflow. In order to avoid integer overflow the following condition (corresponding to Equation 3) must be fulfilled $$-2^{n-1} \le \sum_{i=0}^{C_{in}-1} \tilde{w}_{ij} * \tilde{x}_i \le 2^{n-1} - 1 \qquad \text{Equation (5)}$$

The range of the input values $x_i$ is generally not known. In order to fulfill the condition according to Equation 5 the following restriction is applied $$-A \le \tilde{x}_i \le B \qquad \text{Equation (6)}$$

with an integer lower threshold value A and an integer upper threshold value B. Input data provided for processing is clipped to the integer lower threshold value A and the integer upper threshold value B.

Thus, according to the embodiment the following units are added to a neural network (inference pipeline): A unit configured for scaling, rounding and clipping of input data values before input to the neural network layer and a unit for dividing an output of the neural network layer by scaling factors. If it is guaranteed that only integer valued data (data comprising integer numbers only) is to be processed, the scaling and/or rounding units may be omitted (or not be operated). The units may be added to neural network networks used for data compression/coding, in particular, (variational) autoencoder or transformer architectures as described above.

An exemplary embodiment is illustrated in FIG. 9. FIG. 9 shows neural network layers of a convolutional neural network, for exemplary purposes. The neural network comprises a stack of convolutional layers followed by activation functions, in this case, Leaky ReLU functions. The black arrows in FIG. 9 indicate the input of the new units added to a conventional neural network. Before the convolutional layers input values of real valued input data are multiplied by scaling factors and the results of that multiplication process are rounded to the closest integers. The scaling and/or rounding processes can be omitted, if the input data is already integer valued. If a resulting integer value is smaller than the pre-defined integer lower threshold value-A, the integer value is clipped to the pre-defined lower integer threshold value-A, and if an integer value is larger than the pre-defined integer upper threshold value B, the integer value is clipped to the integer upper threshold value B. The thus resulting input values are processed by the convolutional neural network layers and outputs of these layers are input to the. According to an embodiment, the outputs of the activation functions are divided by scaling factors applied to the input data. According to another embodiment, the outputs of the convolutional neural network layers are divided by scaling factors and subsequently supplied to the activation functions. According to a further embodiment, factorization of each of the scaling factors into two parts is performed and division by the first part can be done before the activation functions and division by the second part can be done after the activation functions.

A neural network like the one shown in FIG. 9 including the units for scaling, rounding and clipping and for dividing an output of the neural network layer by scaling factors (before and/or after the respective activation functions) can be provided both on an encoder side and a decoder side of a coding system, for example, in an encoder for encoding an image and a decoder for decoding an encoded image. For example, it can be employed by the encoders/decoders comprised in the configurations illustrated in FIGS. 2 to 4, 6 and 7.

B) Weights

The condition of Equation 5 can be translated to another condition for the weights of the neural network layer. In the following, it is assumed that the input data $x_i$ and the weights $w_{ij}$ are already converted into integers (if needed) by scaling and rounding as described above. Further, clipping to $-A$ and B, respectively, according to Equation 6 is assumed to be done when necessary. The condition of Equation 5 (for each output channel if different output channels are provided, the index j indicating an output channel is omitted in the following) translates to $$\begin{cases} \max(B, 0) \sum_{w_i \in W | w_i > 0} w_i + \max(-A, 0) \sum_{w_i \in W | w_i < 0} |w_i| + \max(D, 0) \le 2^{n-1} - 1 \qquad \text{Equations (7)} \\ \max(-A, 0) \sum_{w_i \in W | w_i > 0} w_i + \max(B, 0) \sum_{w_i \in W | w_i < 0} |w_i| + \max(-D, 0) \le 2^{n-1} \end{cases}$$

wherein D denotes a bias (that was neglected for simplicity in the discussion above).

If the condition of Equation 7 is fulfilled inference including the clipping of the input data to lower and upper thresholds, respectively, does not cause any overflow of the accumulator register of the neural network. If model weights in a data compression system are allowed to be user-defined, the condition of Equation 7 has to be fulfilled be fulfilled, if bitexact behavior of the neural networks on an encoder side and a decoder side needs to be guaranteed.

According to an embodiment, the integer lower threshold value $-A$ is given by $-2^{k-1}$ and the upper integer threshold value B is given by $2^{k-1}-1$, wherein k denotes a pre-defined bitdepth of the layer input data.

For this case, an easy to be checked condition for the weights can be given by $$\sum_{w_i \in W} |w_i| \le 2^{n-k} - \frac{\max(D, 0)}{2^{k-1}} - 1 \qquad \text{Equations (8)}$$

$$\sum_{w_i \in W} |w_i| \le 2^{n-k} - \frac{\max(-D, 0)}{2^{k-1}}$$

or $$\sum_{w_i \in W} |w_i| \le 2^{n-k} - \frac{|D|}{2^{k-1}} - 1 \qquad \text{Equation (9)}$$

This form of the condition for the weights can be particularly easily calculated for user defined weights to check whether it is guaranteed that overflow will never happen during inference. The conditions according to Equations 8 and 9 have to be fulfilled for each output layer j of the neural network layer.

The bias D can be zero, in principle, and in this case Equations 8 and 9 will even be more simply to be checked.

Particularly, for the case of a one-dimensional convolutional neural network layer the summation $$\sum_{w_i \in W} |w_i|$$

can be obtained by $$\sum_{i=0}^{C_{in}-1} \sum_{k_1=0}^{K_1-1} |w_{ijk_1}|$$

wherein $C_{in}$ denotes the number of input channels of the neural network layer, $K_1$ denotes a convolution kernel size and j denotes an index of an output channel of the neural network layer.

For a two-dimensional convolutional neural network layer the summation $$\sum_{w_i \in W} |w_i|$$

can be obtained by $$\sum_{i=0}^{C_{in}-1} \sum_{k_1=0}^{K_1-1} \sum_{k_2=0}^{K_2-1} |w_{ijk_1 k_2}|$$

wherein $C_{in}$ denotes the number of input channels of the neural network layer, $K_1$ and $K_2$ denote convolution kernel sizes and j denotes an index of an output channel of the neural network layer and, accordingly, for an N-dimensional convolutional neural network layer the same summation can be obtained by $$\sum_{i=0}^{C_{in}-1} \sum_{k_1=0}^{K_1-1} \sum_{k_2=0}^{K_2-1} \cdots \sum_{k_N=0}^{K_N-1} |w_{ijk_1 k_2 \ldots k_N}|$$

wherein $C_{in}$ denotes the number of input channels of the neural network layer, $K_1$, $K_2$, . . . . $K_N$ denote convolution kernel sizes and j denotes an index of an output channel of the neural network layer.

C) Scaling Factors for Weights

Larger scaling factors $s_j$ (to be more precise $2^{s_j}$, see description above) for the weights result in a lower performance loss caused by the conversion to fixed-point arithmetic than smaller ones (see above). One may reasonably assume that $e_j = |out_j - \widetilde{out}_j|$ is minimized when the scaling factors $s_j$ assume largest possible values that still guarantee that the condition of Equations 8 or 9 is fulfilled. Equation 9 translates to the condition for the scaling factors $s_j$ $$s_j < \log_2 \left[ \frac{2^{n-k} - 1 - \frac{|W_j|}{2} - \frac{|b_j|}{2^{k-1}}}{\sum_{w_i \in W_j} |w_i|} \right] \qquad \text{Equation (10)}$$

wherein $W_j$ denotes a subset of trainable weights of the at least one neural network layer, $|W_j|$ denotes number of elements in subset $W_j$, n denotes a bit size of the accumulator register, k denotes a pre-defined bitdepth of the input data and b denotes the bias value.

According to another implementation, $s_j$ of the second scaling factor for the j-th output channel of the at least one neural network layer is given by $$s_j = \left\lfloor \log_2 \left[ \frac{2^{n-k} - 1 - \frac{|W_j|}{2} - \frac{|b_j|}{2^{k-1}}}{\sum_{w_i \in W_j} |w_i|} \right] \right\rfloor \qquad \text{Equation (11)}$$

In these conditions n denotes a bit size of the accumulator register, $w_{ij}$ denote real valued weights and k denotes a pre-defined bitdepth of the input data and $b_j$ denotes a bias value (which can be zero).

Both conditions can advantageously guarantee that no integer overflow will occur for the accumulator register.

According to another implementation the conditions are $$s_j < \log_2 \left[ \frac{2^{n-k} - 1 - \frac{C_{in}}{2} - \frac{|b_j|}{2^{k-1}}}{\sum_{i=0}^{C_{in}-1} |w_{ij}|} \right] \qquad \text{Equation (12)}$$

wherein $C_{in}$ is the number of input channels of the at least one neural network layer, n denotes a bit size of the accumulator register, $w_{ij}$ denote real valued weights and k denotes a pre-defined bitdepth of the input data and $b_j$ denotes a bias value (which can be zero) and $$s_j = \left\lfloor \log_2 \left[ \frac{2^{n-k} - 1 - \frac{C_{in}}{2} - \frac{|b_j|}{2^{k-1}}}{\sum_{i=0}^{C_{in}-1} |w_{ij}|} \right] \right\rfloor \qquad \text{Equation (13)}$$

wherein $C_{in}$ is the number of input channels of the at least one neural network layer, n denotes a bit size of the accumulator register, $w_{ij}$ denote real valued weights and k denotes a pre-defined bitdepth of the input data and $b_j$ denotes a bias value (which can be zero) and wherein $\lfloor x \rfloor$=floor (x). For given real weights as well as k and n the condition of Equation 11 has to be fulfilled by the scaling factors $s_j$ in order to guarantee that overflow will never happen during inference.

In order to convert a whole neural network pipeline to fixed-point arithmetic parameters p and k are to be known. These parameters can, for example, be selected by checking all possible combinations of (p, k), $0 \leq p \leq k \leq n$ and corresponding $s_j$ obtained using equation (10) for selected k and predefined n on some calibration dataset. The minimum value of a pre-defined loss function corresponds to the best pair (p, k). The loss function can represent the number of bits needed for encoding some image or likelihood estimation of it, for example. Distortion also can be used as a part of a loss function used, if not only an entropy part but also analysis and synthesis parts (see, for example, the left-hand side of the configuration shown in FIG. 4) are to be converted to fixed point arithmetic.

D) Activation Functions

In order to guarantee device interoperability of an entire neural network bitexact reproducibility of activation functions on different platforms/devices is desirable. For linear and relatively simple non-linear activation functions like, for example, the ReLU function that basically defines a clipping procedure this requirement can be relatively easily fulfilled. For more complicated non-linearities, particularly, those including exponential functions (with base e, other bases may be involved though), like Softmax $$(x)_i = \frac{e^{x_i}}{\sum_{j=1}^{K} e^{x_j}},$$

calculation results can be different on different platforms because the respective precision of the exponent calculation can be different and even if the input is integer value and the output is rounded to integer values, the result can be different due to small discrepancies before rounding. Thus, for systems that require bitexact inference on neural networks it is crucial issue to replace such non-linearities of the mathematically defined activation functions by some approximation functions that can be calculated in a bitexact form on different platforms.

According to embodiments, mathematically defined non-linear activation functions are replaced by approximation functions selected from a group consisting of a polynomial function, a rational function, a finite Taylor series, the ReLU function, the Leaky ReLU function and the parametric ReLU function. The mathematically defined non-linear activation function that is to be replaced may be the Softmax function, the sigmoid function, the hyperbolic tangent function, the Swish function the Gaussian Error Linear Unit function or the Scaled Exponential Linear Unit function.

The approximation functions can be employed by the encoders/decoders comprised in the configurations illustrated in FIGS. 2 to 4, 6 and 7, for example, and be used in the context of data compression/coding, in general.

In general for an arbitrary non-linear activation function a sum of a few first elements of it's Taylor series can be used. A Taylor series for a mathematically defined function $f(x)$ around a pre-defined value a defined as $$f(x) = \sum_{i=0}^{\infty} \frac{f^{(i)}(a)}{i!} (x-a)^i.$$

The value a should be selected close to expecting values of x. In the context of neural networks wherein processed data and weights are usually relatively close to zero, a may be selected equal to 0. Such a particular case of Taylor series is called Maclaurin series. For example, the Maclaurin series for $f(x)=e^x$ is given by $$f(x) = 1 + x + \frac{x^2}{2!} + \frac{x^3}{3!} + \dots$$

Depending on the precision needed more or less first elements of this sum can be used to approximate $f(x)=e^x$. Using more elements will give better precision but will cause a higher computational complexity and higher risk of overflow. For fixed-point neural networks in that bitexact behavior on different platforms should be guaranteed, the following conditions are desirably to be fulfilled:

$$-2^{n-1} \leq (x-a)^i \leq 2^{n-1} - 1 \text{ for each } i = 0, 1, 2, \dots k-1, \quad \text{Equations (14)}$$

$$-2^{n-1} \leq \frac{f^{(i)}(a)}{i!}(x-a)^i \leq 2^{n-1} - 1 \text{ for each } i = 0, 1, 2, \dots k-1$$

and $$-2^{n-1} \leq \sum_{i=0}^{k-1} \frac{f^{(i)}(a)}{i!}(x-a)^i \leq 2^{n-1} - 1$$

with some accumulator register bitdepth (size) n (for example, n=16 bits or 32 bits).

It is noted that depending on the actual applications approximation of a mathematically defined non-linear activation function by a rational or polynomial function might be considered particularly suitable.

In particular, according to an embodiment the Softmax $$f(x)_i = \frac{e^{x_i}}{\sum_{j=1}^{K} e^{x_j}}$$

working on the i components of the vector x is replaced by the approximation function $$f(x)_i = \frac{ReLU(x_i) + \varepsilon}{\sum_{j=1}^{K} (ReLU(x_j) + \varepsilon)} \qquad \text{Equation (15)}$$

or, alternatively, the approximation function $$f(x)_i = \frac{ReLU(1 + x_i) + \varepsilon}{\sum_{j=1}^{K} (ReLU(1 + x_j) + \varepsilon)} \qquad \text{Equation (16)}$$

with a small constant $\varepsilon$ (for example, in the range of $10^{-15}$ to $10^{-11}$) added to avoid division by zero for the case of only non-positive input values. As usual for the i-th component of the input vector x normalization by the sum over all components $j=1, \dots, K$ of the input vector x is made. The second alternative according to Equation 16 is motivated by the approximation of $e^x \approx 1+x$ for small values of x close to 0.

The Softmax functions as defined by Equations 15 and 16 might advantageously be used as activation functions for a final one of a stack of (for example, convolutional) neural network layers and provide for a classification result to be obtained by the neural network, for example.

In particular, it is provided an embodiment related to a method 1000 of operating a neural network wherein integer overflow can be avoided. The neural network comprises a neural network layer comprising or connected with an accumulator register for buffering summation results and having a pre-defined accumulator register size. The method 1000 comprises defining S1010 an integer lower threshold value and an integer upper threshold value for values of integer numbers comprised in data entities (numbers, vectors or tensors, for example) of input data for the neural network layer. Further, the method comprises if a value of an integer number comprised in a data entity of the input data is smaller than the defined integer lower threshold value, clipping S1020 the value of the integer number comprised in the data entity of the input data to the defined integer lower threshold value, and if a value of an integer numbers comprised in a data entity of the input data is larger than the defined integer upper threshold value, clipping S1020 the value of the integer numbers comprised in the data entity of the input data to the defined integer upper threshold value in order to avoid integer overflow of the accumulator register. By the method 1000 as illustrated in FIG. 10 when running the same procedure with the same input data on two devices/platforms the same results for both devices/platforms can be obtained, since integer overflow can be avoided by employment of the clipping procedure.

Figure 10:
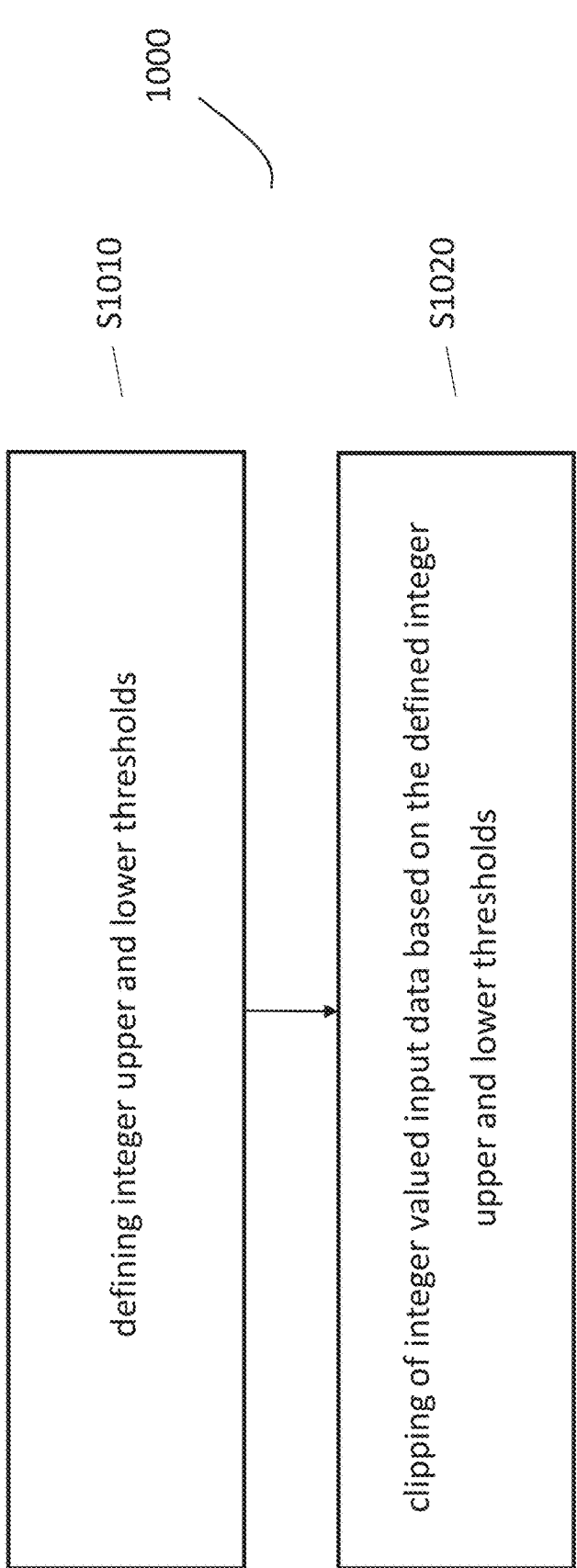
FIG. 10 is a flow chart illustrating a method of operating a neural network comprising clipping of input data.
Figure 11:
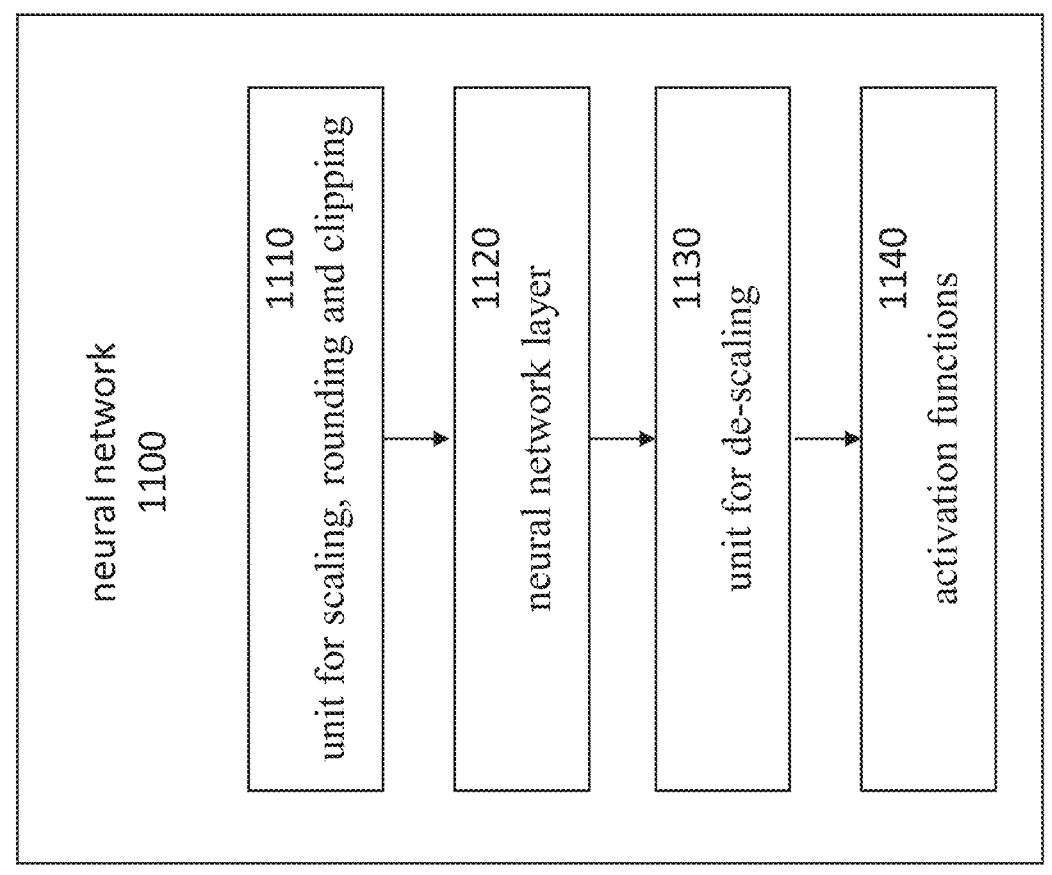
FIG. 11 illustrates a neural network comprising units for clipping, scaling and rounding as well as de-scaling in accordance with an embodiment.

The method illustrated in FIG. 10 can be implemented in any kind of neural network, for example, a neural network comprising one or more fully connected neural network layers or one or more convolutional neural network layers. In particular, it is provided a neural network 1100 illustrated in FIG. 11. The neural network 1100 can make use of the method 1000. The neural network 1100 comprises a unit 1110 for scaling, rounding and clipping. The unit 1110 may be divided into sub-units each configured for different operations as the scaling, rounding and clipping of the input data and on- and off-operation of the first unit and each of the sub-units, respectively, may be switchable. The unit 1110 may be configured for receiving real valued input data (data comprising real numbers) and for converting it into integer valued input data by multiplication of input data values by a scaling factor and rounding the multiplication results to the next integers as described above. The resulting integer values are clipped to integer lower and upper threshold values if needed.

The integerized and clipped data is input into a neural network layer 1120. Downstream of the neural network layer 1120 a unit 1130 for de-scaling is provided. The unit 1130 for de-scaling may divide the outputs of the neural network layer 1120 by a scaling factor. The output of the unit 1130 for de-scaling may be input to activation functions 1140. Alternatively, the outputs of the neural network layer 1120 may be directly input into the activation functions 1140 and the unit 1130 for de-scaling is provided downstream of the activation functions 1140 and divides the outputs of the same. Alternatively, de-scaling by the unit 1130 for de-scaling is partly done on outputs of the neural network layer 1120 (by a first factorization part of the scaling factor) and, subsequently, it is partly done on outputs of the activation functions 1140 (by a second factorization part of the scaling factor).

Figure 12:
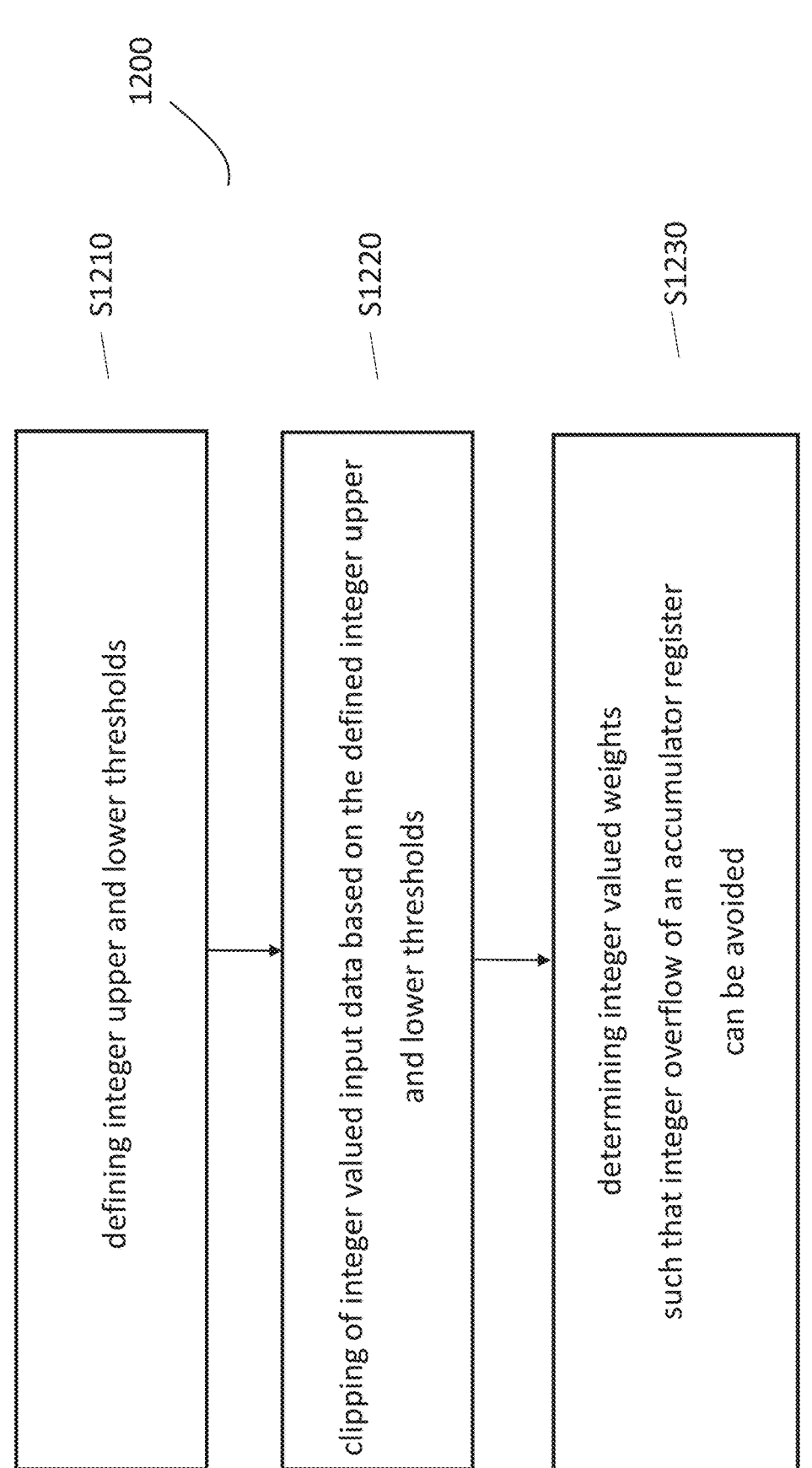
FIG. 12 is a flow chart illustrating a method of operating a neural network comprising the conditioning of weights of a neural network layer.

In particular, it is provided an embodiment related to a method 1200 of operating a neural network based on conditioned weights as illustrated in FIG. 12. The neural network comprises a neural network layer comprising or connected with an accumulator register for buffering summation results and having a pre-defined accumulator register size. The method 1200 comprises defining S1210 an integer lower threshold value, A, and an integer upper threshold value, B, for values of integer numbers comprised in data entities (numbers, vectors or tensors, for example) of input data for the neural network layer. Further, the method comprises if a value of an integer number comprised in a data entity of the input data is smaller than the defined integer lower threshold value, clipping S1220 the value of the integer number comprised in the data entity of the input data to the defined integer lower threshold value, and if a value of an integer number comprised in a data entity of the input data is larger than the defined integer upper threshold value, clipping S1220 the value of the integer number comprised in the data entity of the input data to the defined integer upper threshold value. Further, the method comprises determining S1230 integer valued weights (i.e., weights comprising integer numbers, for example, integer numbers only) of the neural network layer based on the defined integer lower threshold value, the defined integer upper threshold value and the pre-defined accumulator register size, such that integer overflow of the accumulator register can be avoided.

By the method 1200 as illustrated in FIG. 12 when running the same procedure with the same input data on two devices/platforms the same results for both devices/platforms can be obtained. Particularly, in the context of entropy model based coding and/or compressing and decompressing of data, for example, image data, it is a crucial issue to provide for substantially bitexact processing results on an encoding and decoding side, respectively, in order to provide for the same or complementary technical effects which can be obtained by the method 1200 illustrated in FIG. 12.

In particular, it is provided, according to an embodiment, a method 1300 of operating a neural network (see FIG. 13). The method 1300 comprises implementing 1310 an approximation function of a mathematically defined real valued non-linear activation function as an activation function of the at least one neural network layer, wherein the approximation function allows for integer-only processing of fixed-point representations of input values of the approximation function. The approximation function may comprise at least one of a polynomial function, rational function, a finite Taylor series, the ReLU function, the Leaky ReLU function and the parametric ReLU function. The mathematically defined non-linear activation function may be selected from a group consisting of the Softmax function, the sigmoid function, the hyperbolic tangent function, the Swish function the Gaussian Error Linear Unit function and the Scaled Exponential Linear Unit function. In particular, the approximated activation function may be one of $$f(x)_i = \frac{ReLU(x_i) + \varepsilon}{\sum_{j=1}^{K}(ReLU(x_j) + \varepsilon)}$$

and

-continued $$f(x)_i = \frac{\mathrm{ReLU}(1+x_i) + \varepsilon}{\sum_{j=1}^{K}(\mathrm{ReLU}(1+x_j)+\varepsilon)}$$

wherein $\varepsilon$ denotes a (small) positive constant avoiding division by zero.

Provision of the above-mentioned approximated (approximation) activation functions may allow for bitexact reproductions of crucial numerical operations on an encoder side and a decoder side, respectively, since, particularly, the calculation of exponential functions can be avoided such that the technical effects obtained by these numerical operations are the same or complementary to each other.

Figure 14:
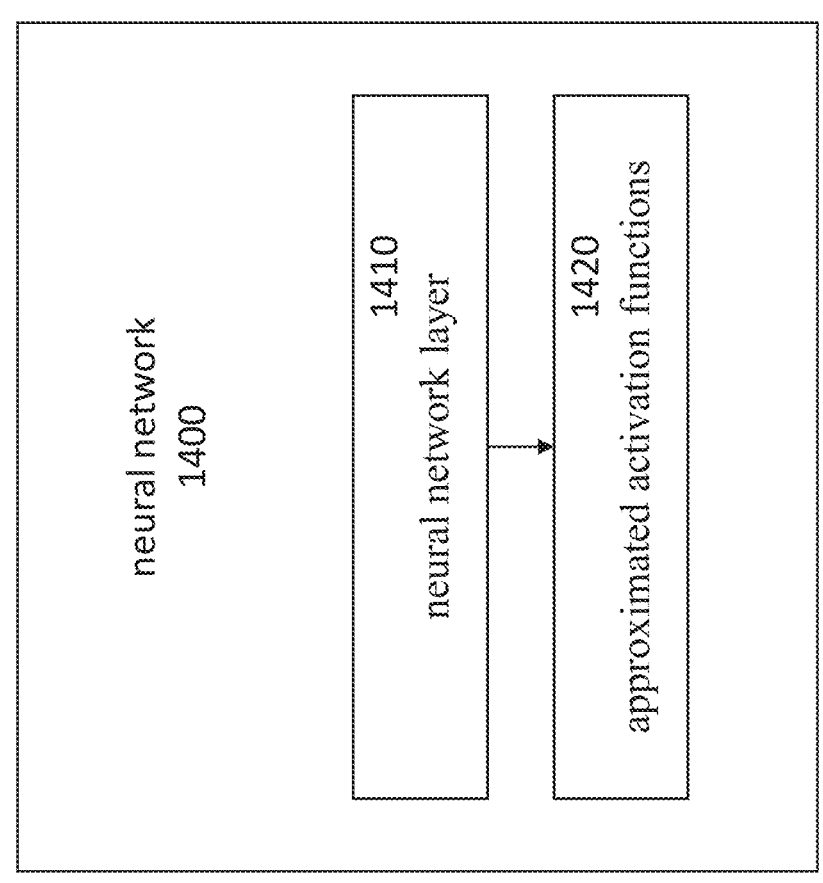
FIG. 14 illustrates a neural network comprising an approximated activation function in accordance with an embodiment.

According to an embodiment, it is provided a neural network 1400 as illustrated in FIG. 14. The neural network 1400 comprises at least one neural network layer 1410 and an activation function 1420 connected to an output of the at least one neural network layer 1410, wherein the activation function 1420 is implemented as an approximation function of a mathematically defined real valued non-linear activation function (taking real numbers as arguments and outputting real numbers) and wherein the approximation function allows for integer-only processing of fixed-point representations of input values of the approximation function.

At least some of the steps of methods 1000, 1200 and 1300 described with reference to FIGS. 10, 12 and 13 may be comprised in methods of encoding or decoding data, for example, at least a portion of an image. According to embodiments, the encoding or decoding is based on an entropy model providing statistical (probability) properties of symbols to be encoded or decoded, for example, mean values, variance, (cross) correlations, etc. The entropy model may be provided by a hyperprior of a variational autoencoder, an autoregressive prior of a variational autoencoder or a combination of hyperprior and autoregressive prior of a variational autoencoder. Employment of the 1000, 1200 and 1300 described with reference to FIGS. 10, 12 and 13 for data coding, for example, image coding, can prove advantageous with respect to high-quality reconstruction of encoded/compressed data without suffering from severe corruption.

Figure 15:
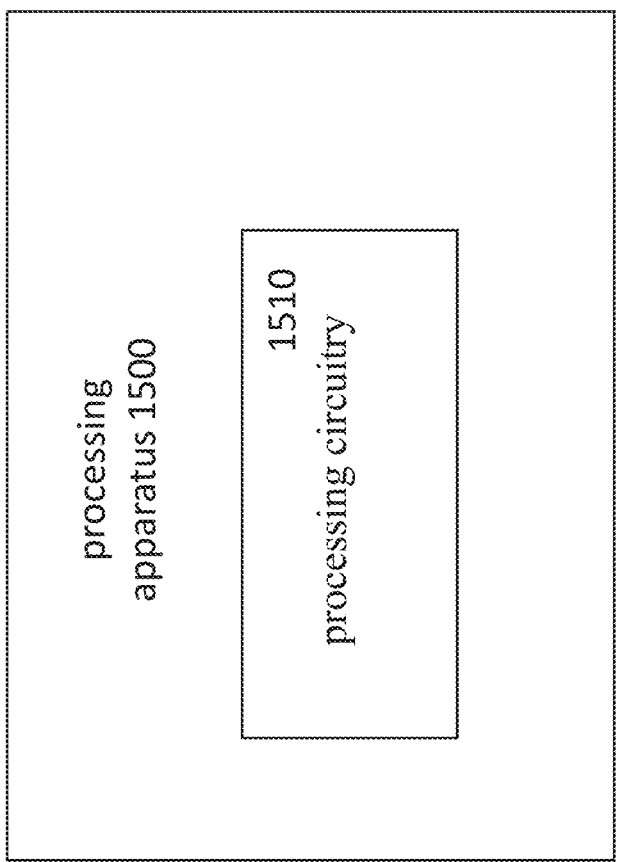
FIG. 15 shows an exemplary apparatus configured for performing the steps of the methods illustrated in FIGS. 10, 12 and 13.

The methods 1000, 1200 and 1300 described with reference to FIGS. 10, 12 and 13 may be implemented in an apparatus 1500 as shown in FIG. 15 and the apparatus 1500 as shown in FIG. 15 may be configured to perform the steps of these methods. According to an embodiment, the apparatus 1500 comprises a processing circuitry configured for performing the steps of the methods 1000, 1200 and 1300 described with reference to FIGS. 10, 12 and 13. Further, the apparatus 1500 may comprise at least one of the neural network illustrated in FIGS. 9, 11 and 14. The apparatus 1500 can be comprised by an encoder (for example, encoder 20) shown in FIGS. 16 and 17) or decoder (for example, decoder 20 shown in FIGS. 16 and 17) or it can be comprised by the video coding device 8000 shown in FIG. 18 or the apparatus 9000 shown in FIG. 19.

The apparatus 1500 may be an apparatus for encoding or decoding data, for example, at least a portion of an image. Further, the apparatus 1500 may comprise or be comprised in an (variational) autoencoder or transformer as described above.

While operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Some Exemplary Implementations in Hardware and Software

Figure 16:
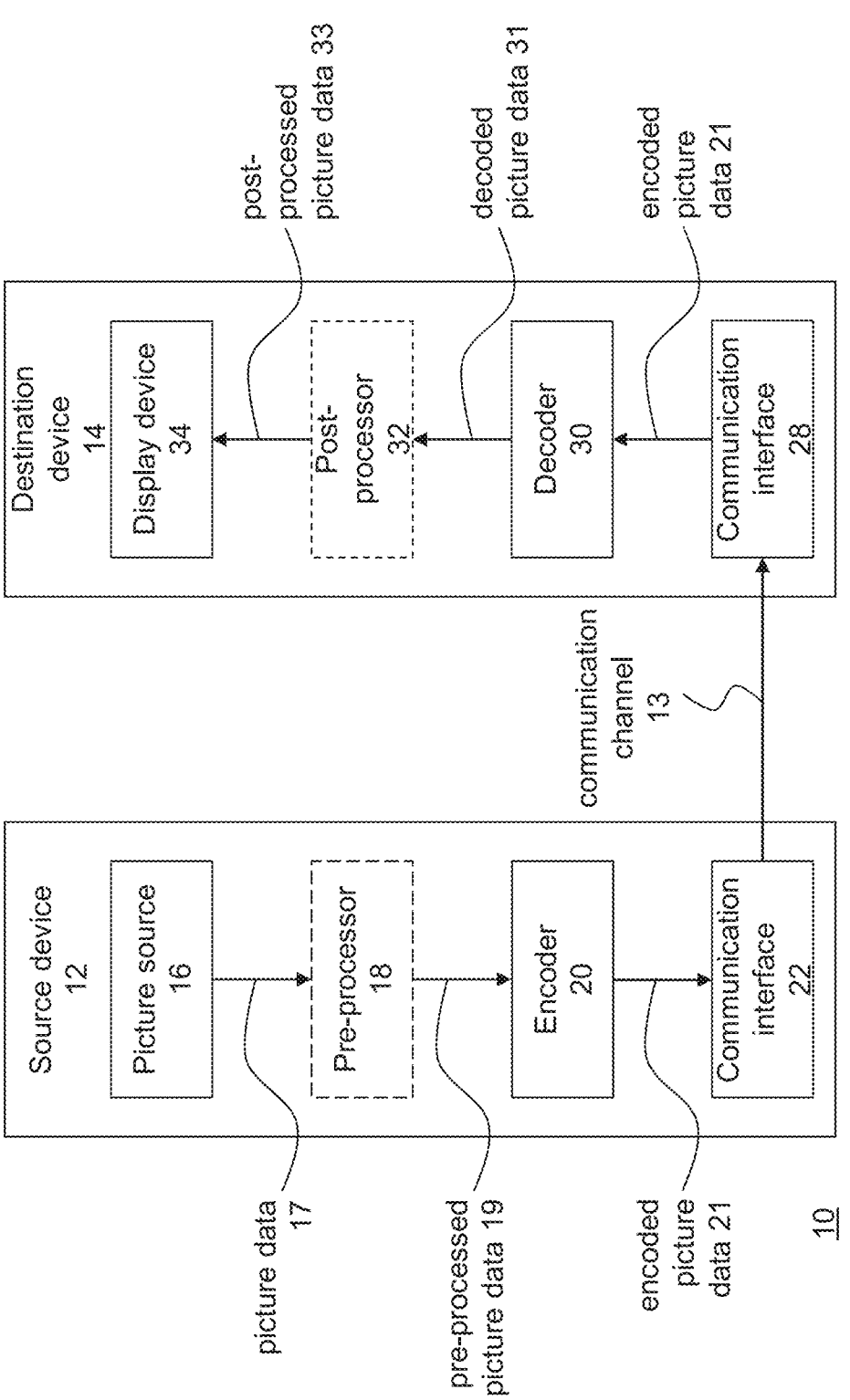
FIG. 16 is a block diagram showing an example of a video coding system configured to implement embodiments of the present disclosure.

The corresponding system which may deploy the above-mentioned encoder-decoder processing chain is illustrated in FIG. 16. FIG. 16 is a schematic block diagram illustrating an example coding system, e.g. a video, image, audio, and/or other coding system (or short coding system) that may utilize techniques of this present application. Video encoder 20) (or short encoder 20) and video decoder 30 (or short decoder 30) of video coding system 10 represent examples of devices that may be configured to perform techniques in accordance with various examples described in the present application. For example, the video coding and decoding may employ neural network such which may be distributed and which may apply the above-mentioned bitstream parsing and/or bitstream generation to convey feature maps between the distributed computation nodes (two or more).

As shown in FIG. 16, the coding system 10 comprises a source device 12 configured to provide encoded picture data 21 e.g. to a destination device 14 for decoding the encoded picture data 13.

The source device 12 comprises an encoder 20, and may additionally, i.e. optionally, comprise a picture source 16, a pre-processor (or pre-processing unit) 18, e.g. a picture pre-processor 18, and a communication interface or communication unit 22.

The picture source 16 may comprise or be any kind of picture capturing device, for example a camera for capturing a real-world picture, and/or any kind of a picture generating device, for example a computer-graphics processor for generating a computer animated picture, or any kind of other device for obtaining and/or providing a real-world picture, a computer generated picture (e.g. a screen content, a virtual reality (VR) picture) and/or any combination thereof (e.g. an augmented reality (AR) picture). The picture source may be any kind of memory or storage storing any of the aforementioned pictures.

In distinction to the pre-processor 18 and the processing performed by the pre-processing unit 18, the picture or picture data 17 may also be referred to as raw picture or raw picture data 17.

Pre-processor 18 is configured to receive the (raw) picture data 17 and to perform pre-processing on the picture data 17 to obtain a pre-processed picture 19 or pre-processed picture data 19. Pre-processing performed by the pre-processor 18 may, e.g., comprise trimming, color format conversion (e.g. from RGB to YCbCr), color correction, or de-noising. It can be understood that the pre-processing unit 18 may be optional component. It is noted that the pre-processing may also employ a neural network (such as in any of FIGS. 1 to 7) which uses the presence indicator signaling.

The video encoder 20 is configured to receive the pre-processed picture data 19 and provide encoded picture data 21.

Communication interface 22 of the source device 12 may be configured to receive the encoded picture data 21 and to transmit the encoded picture data 21 (or any further processed version thereof) over communication channel 13 to another device, e.g. the destination device 14 or any other device, for storage or direct reconstruction.

The destination device 14 comprises a decoder 30 (e.g. a video decoder 30), and may additionally, i.e. optionally, comprise a communication interface or communication unit 28, a post-processor 32 (or post-processing unit 32) and a display device 34.

The communication interface 28 of the destination device 14 is configured receive the encoded picture data 21 (or any further processed version thereof), e.g. directly from the source device 12 or from any other source, e.g. a storage device, e.g. an encoded picture data storage device, and provide the encoded picture data 21 to the decoder 30.

The communication interface 22 and the communication interface 28 may be configured to transmit or receive the encoded picture data 21 or encoded data 13 via a direct communication link between the source device 12 and the destination device 14, e.g. a direct wired or wireless connection, or via any kind of network, e.g. a wired or wireless network or any combination thereof, or any kind of private and public network, or any kind of combination thereof.

The communication interface 22 may be, e.g., configured to package the encoded picture data 21 into an appropriate format, e.g. packets, and/or process the encoded picture data using any kind of transmission encoding or processing for transmission over a communication link or communication network.

The communication interface 28, forming the counterpart of the communication interface 22, may be, e.g., configured to receive the transmitted data and process the transmission data using any kind of corresponding transmission decoding or processing and/or de-packaging to obtain the encoded picture data 21.

Both, communication interface 22 and communication interface 28 may be configured as unidirectional communication interfaces as indicated by the arrow for the communication channel 13 in FIG. 16 pointing from the source device 12 to the destination device 14, or bi-directional communication interfaces, and may be configured, e.g. to send and receive messages, e.g. to set up a connection, to acknowledge and exchange any other information related to the communication link and/or data transmission, e.g. encoded picture data transmission. The decoder 30 is configured to receive the encoded picture data 21 and provide decoded picture data 31 or a decoded picture 31.

The post-processor 32 of destination device 14 is configured to post-process the decoded picture data 31 (also called reconstructed picture data), e.g. the decoded picture 31, to obtain post-processed picture data 33, e.g. a post-processed picture 33. The post-processing performed by the post-processing unit 32 may comprise, e.g. color format conversion (e.g. from YCbCr to RGB), color correction, trimming, or re-sampling, or any other processing, e.g. for preparing the decoded picture data 31 for display, e.g. by display device 34.

The display device 34 of the destination device 14 is configured to receive the post-processed picture data 33 for displaying the picture, e.g. to a user or viewer. The display device 34 may be or comprise any kind of display for representing the reconstructed picture, e.g. an integrated or external display or monitor. The displays may, e.g. comprise liquid crystal displays (LCD), organic light emitting diodes (OLED) displays, plasma displays, projectors, micro LED displays, liquid crystal on silicon (LCoS), digital light processor (DLP) or any kind of other display.

Although FIG. 16 depicts the source device 12 and the destination device 14 as separate devices, embodiments of devices may also comprise both or both functionalities, the source device 12 or corresponding functionality and the destination device 14 or corresponding functionality. In such embodiments the source device 12 or corresponding functionality and the destination device 14 or corresponding functionality may be implemented using the same hardware and/or software or by separate hardware and/or software or any combination thereof.

As will be apparent for the skilled person based on the description, the existence and (exact) split of functionalities of the different units or functionalities within the source device 12 and/or destination device 14 as shown in FIG. 16 may vary depending on the actual device and application.

Figure 17:
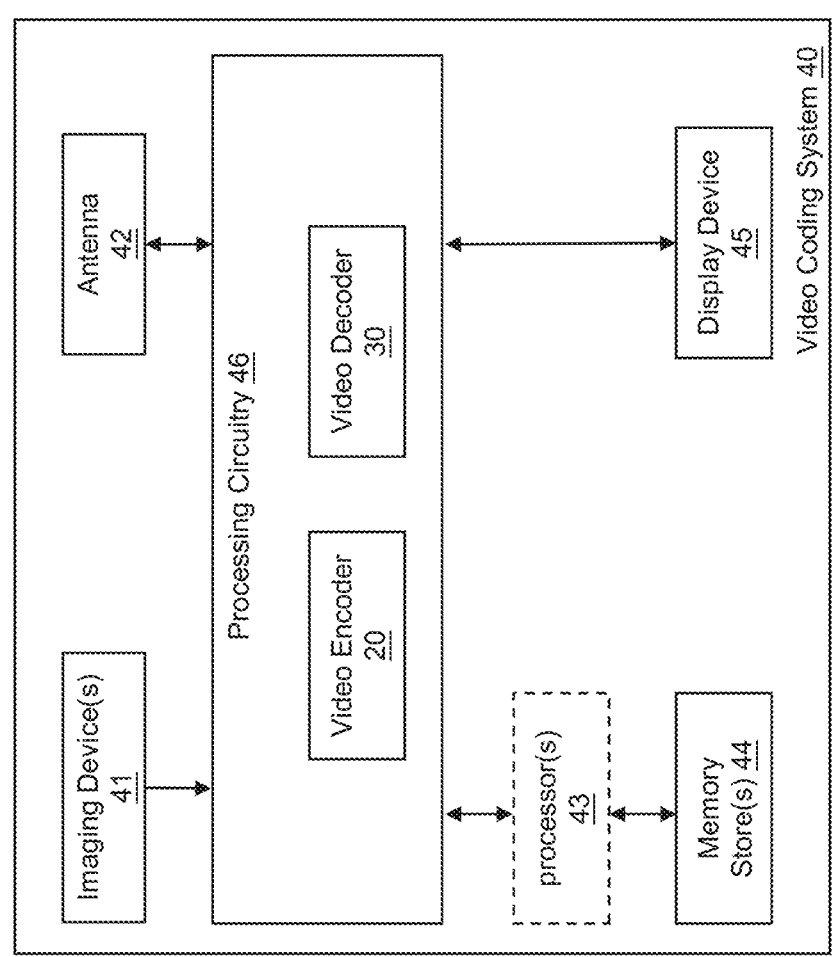
FIG. 17 is a block diagram showing another example of a video coding system configured to implement embodiments of the present disclosure.

The encoder 20 (e.g. a video encoder 20) or the decoder 30 (e.g. a video decoder 30) or both encoder 20 and decoder 30 may be implemented via processing circuitry, such as one or more microprocessors, digital signal processors (DSPs), application-specific integrated circuits (ASICs), field-programmable gate arrays (FPGAs), discrete logic, hardware, video coding dedicated or any combinations thereof. The encoder 20 may be implemented via processing circuitry 46 to embody the various modules including the neural network or its parts. The decoder 30 may be implemented via processing circuitry 46 to embody any coding system or subsystem described herein. The processing circuitry may be configured to perform the various operations as discussed later. If the techniques are implemented partially in software, a device may store instructions for the software in a suitable, non-transitory computer-readable storage medium and may execute the instructions in hardware using one or more processors to perform the techniques of this disclosure. Either of video encoder 20 and video decoder 30 may be integrated as part of a combined encoder/decoder (CODEC) in a single device, for example, as shown in FIG. 17.

Source device 12 and destination device 14 may comprise any of a wide range of devices, including any kind of handheld or stationary devices, e.g. notebook or laptop computers, mobile phones, smart phones, tablets or tablet computers, cameras, desktop computers, set-top boxes, televisions, display devices, digital media players, video gaming consoles, video streaming devices (such as content services servers or content delivery servers), broadcast receiver device, broadcast transmitter device, or the like and may use no or any kind of operating system. In some cases, the source device 12 and the destination device 14 may be equipped for wireless communication. Thus, the source device 12 and the destination device 14 may be wireless communication devices.

In some cases, video coding system 10 illustrated in FIG. 16 is merely an example and the techniques of the present application may apply to video coding settings (e.g., video encoding or video decoding) that do not necessarily include any data communication between the encoding and decoding devices. In other examples, data is retrieved from a local memory, streamed over a network, or the like. A video encoding device may encode and store data to memory, and/or a video decoding device may retrieve and decode data from memory. In some examples, the encoding and decoding is performed by devices that do not communicate with one another, but simply encode data to memory and/or retrieve and decode data from memory.

Figure 18:
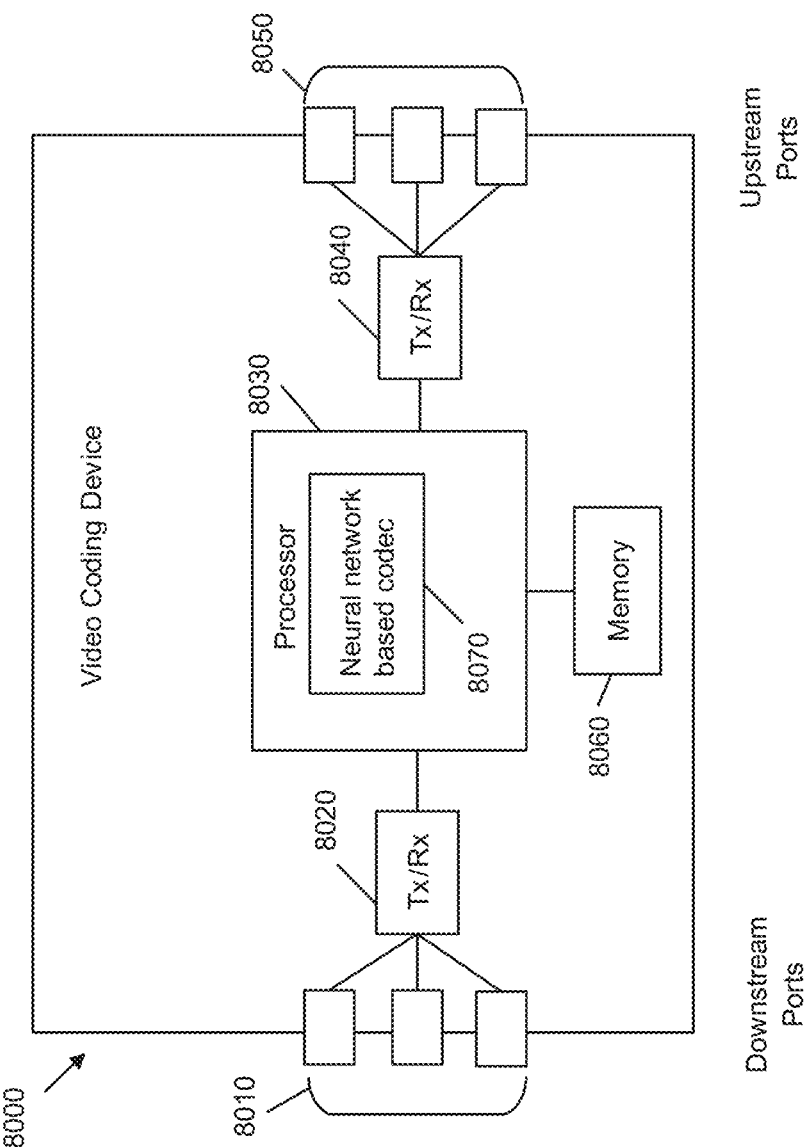
FIG. 18 is a block diagram illustrating an example of an encoding apparatus or a decoding apparatus.

FIG. 18 is a schematic diagram of a video coding device 8000 according to an embodiment of the disclosure. The video coding device 8000 is suitable for implementing the disclosed embodiments as described herein. In an embodiment, the video coding device 8000 may be a decoder such as video decoder 30 of FIG. 16 or an encoder such as video encoder 20 of FIG. 16.

The video coding device 8000 comprises ingress ports 8010 (or input ports 8010) and receiver units (Rx) 8020 for receiving data: a processor, logic unit, or central processing unit (CPU) 8030 to process the data: transmitter units (Tx) 8040 and egress ports 8050 (or output ports 8050) for transmitting the data; and a memory 8060 for storing the data. The video coding device 8000 may also comprise optical-to-electrical (OE) components and electrical-to-optical (EO) components coupled to the ingress ports 8010, the receiver units 8020, the transmitter units 8040, and the egress ports 8050 for egress or ingress of optical or electrical signals.

The processor 8030 is implemented by hardware and software. The processor 8030 may be implemented as one or more CPU chips, cores (e.g., as a multi-core processor), FPGAS, ASICs, and DSPs. The processor 8030 is in communication with the ingress ports 8010, receiver units 8020, transmitter units 8040, egress ports 8050, and memory 8060. The processor 8030 comprises a neural network based codec 8070. The neural network based codec 8070 implements the disclosed embodiments described above. For instance, the neural network based codec 8070 implements, processes, prepares, or provides the various coding operations. The inclusion of the neural network based codec 8070 therefore provides a substantial improvement to the functionality of the video coding device 8000 and effects a transformation of the video coding device 8000 to a different state. Alternatively, the neural network based codec 8070 is implemented as instructions stored in the memory 8060 and executed by the processor 8030.

The memory 8060 may comprise one or more disks, tape drives, and solid-state drives and may be used as an overflow data storage device, to store programs when such programs are selected for execution, and to store instructions and data that are read during program execution. The memory 8060 may be, for example, volatile and/or non-volatile and may be a read-only memory (ROM), random access memory (RAM), ternary content-addressable memory (TCAM), and/or static random-access memory (SRAM).

Figure 19:
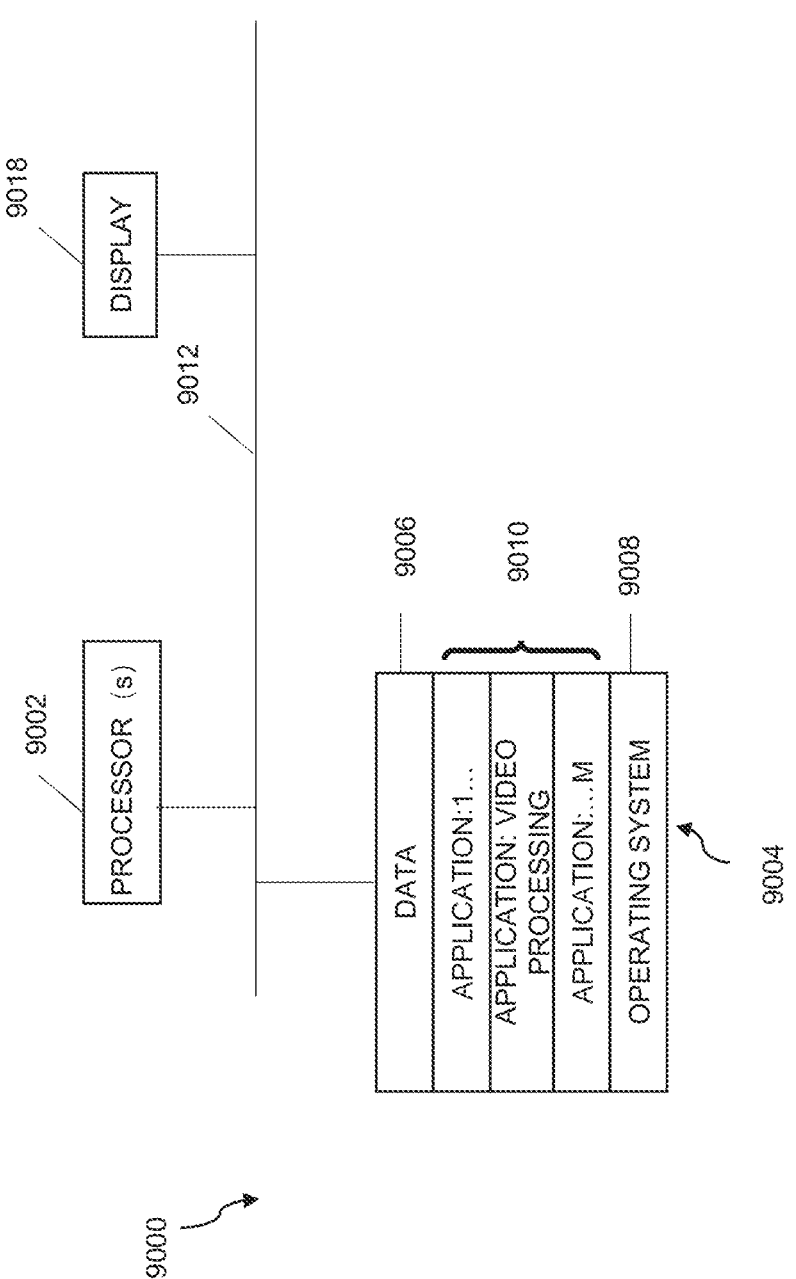
FIG. 19 is a block diagram illustrating another example of an encoding apparatus or a decoding apparatus.

FIG. 19 is a simplified block diagram of an apparatus that may be used as either or both of the source device 12 and the destination device 14 from FIG. 16 according to an exemplary embodiment.

A processor 9002 in the apparatus 9000 can be a central processing unit. Alternatively, the processor 9002 can be any other type of device, or multiple devices, capable of manipulating or processing information now-existing or hereafter developed. Although the disclosed implementations can be practiced with a single processor as shown, e.g., the processor 9002, advantages in speed and efficiency can be achieved using more than one processor.

A memory 9004 in the apparatus 9000 can be a read only memory (ROM) device or a random access memory (RAM) device in an implementation. Any other suitable type of storage device can be used as the memory 9004. The memory 9004 can include code and data 9006 that is accessed by the processor 9002 using a bus 9012. The memory 9004 can further include an operating system 9008 and application programs 9010, the application programs 9010 including at least one program that permits the processor 9002 to perform the methods described here. For example, the application programs 9010 can include applications 1 through N, which further include a video coding application that performs the methods described here.

The apparatus 9000 can also include one or more output devices, such as a display 9018. The display 9018 may be, in one example, a touch sensitive display that combines a display with a touch sensitive element that is operable to sense touch inputs. The display 9018 can be coupled to the processor 9002 via the bus 9012.

Although depicted here as a single bus, the bus 9012 of the apparatus 9000 can be composed of multiple buses. Further, a secondary storage can be directly coupled to the other components of the apparatus 9000 or can be accessed via a network and can comprise a single integrated unit such as a memory card or multiple units such as multiple memory cards. The apparatus 9000 can thus be implemented in a wide variety of configurations.

What is claimed is:

1. A neural network, comprising:

at least one neural network layer; and an activation function connected to an output of the at least one neural network layer to provide an entropy model;

wherein the activation function is implemented as an approximation function of a mathematically defined real valued non-linear activation function, wherein the approximation function allows for integer-only processing of fixed-point representations of input values of the approximation function, wherein the approximation function comprises a finite number of Taylor series summands which are determined based on expected values of data to be input to the at least one neural network layer or into the approximation function, and an accumulator register size of an accumulator register, wherein the neural network further comprises the accumulator register for buffering summation results, and wherein the neural network is configured to:

reconstruct at least a portion of an image by processing a bitstream based on the provided entropy model to obtain a latent tensor representing a component of the image, and processing the latent tensor to obtain a tensor representing the component of the image; or transform the tensor representing the component of the image into the latent tensor, and processing the latent tensor based on the provided entropy model to generate the bitstream.

2. The neural network according to claim 1, wherein the approximation function further comprises at least one of a polynomial function, rational function, a rectified linear activation (ReLU) function, a LeakyReLU function, or a parametric ReLU function.

3. The neural network according to claim 2, wherein the approximation function further comprises the polynomial function and a maximum degree of the polynomial function is determined based on at least one of a) the expected values of data to be input to the at least one neural network layer or into the approximation function, b) the accumulator register size of the accumulator register for buffering the summation results, or c) the approximation function, or wherein the approximation function further comprises the rational function and a maximum degrees of polynomials in nominator and denominator of the rational function are determined based on at least one of a) the expected values of data to be input the at least one neural network layer or into the approximation function, b) the accumulator register size of the accumulator register for buffering the summation results, or c) the approximation function.

4. The neural network according to claim 1, wherein the mathematically defined real valued non-linear activation function is selected from a group consisting of a Softmax function, a sigmoid function, a hyperbolic tangent function, a Swish function, a Gaussian Error Linear Unit function, or a Scaled Exponential Linear Unit function.

5. The neural network according to claim 4, wherein the mathematically defined non-linear activation function is the Softmax function and the approximation function is defined as $$f(x)_i = \frac{ReLU(x_i) + \varepsilon}{\sum_{j=1}^{K}(ReLU(x_j) + \varepsilon)}$$

wherein i denotes an i-th component of an input vector x and a sum runs over all K components of that input vector, and $\varepsilon$ denotes a positive constant avoiding division by zero, or wherein the mathematically defined non-linear activation function is the Softmax function and the approximation function is defined as $$f(x)_i = \frac{ReLU(1 + x_i) + \varepsilon}{\sum_{j=1}^{K}(ReLU(1 + x_j) + \varepsilon)}$$

wherein i denotes an i-th component of an input vector x and a sum runs over all K components of that input vector, and wherein $\varepsilon$ denotes a positive constant avoiding division by zero.

6. An apparatus for encoding at least a portion of the image, comprising an encoder side of an autoencoder comprising the neural network according to claim 1, the autoencoder comprising the encoder side and a decoder side, the encoder side being configured to output the bitstream encoding at least the portion of the image.

7. The apparatus according to claim 6, wherein the autoencoder is a variational autoencoder, the apparatus comprising one of a) hyperprior of the variational autoencoder comprising the neural network, b) an autoregressive prior of the variational autoencoder comprising the neural network, or c) a combination of the hyperprior and the autoregressive prior of the variational autoencoder at least one of which comprises the neural network.

8. An apparatus for decoding at least the portion of the image, comprising a decoder side of an autoencoder comprising the neural network according to claim 1, the autoencoder comprising an encoder side and the decoder side, the decoder side being configured to receive the bitstream encoding at least the portion of the image, reconstruct at least the portion of the image, and output at least the reconstructed portion of the image.

9. An apparatus for encoding at least the portion of the image, comprising an encoder side of an autoencoder comprising the neural network according to claim 1, the autoencoder comprising the encoder side and the decoder side, the apparatus further comprising processing circuitry configured for transforming the tensor representing the component of the image into the latent tensor, providing the entropy model using the neural network, and processing the latent tensor based on the provided entropy model to generate the bitstream.

10. An apparatus for decoding at least the portion of the image, comprising a decoder side of an autoencoder comprising the neural network according to claim 1, the autoencoder comprising a decoder side and an encoder side, the apparatus further comprising processing circuitry configured for: providing the entropy model using the neural network, processing the bitstream based on the provided entropy model to obtain the latent tensor representing the component of the image, and processing the latent tensor to obtain the tensor representing the component of the image.

11. The neural network according to claim 1, wherein $s_j$ represents a fractional part of real valued weights, wherein $s_j$ of a second scaling factor for a j-th output channel of the at least one neural network layer fulfills a condition defined as:

$$s_j < \log_2\left[\frac{2^{n-k} - 1 - \frac{|W_j|}{2} - \frac{|b_j|}{2^{k-1}}}{\sum_{w_i \in W_j}|w_i|}\right]$$

wherein $W_j$ denotes a subset of trainable weights of the at least one neural network layer, $|W_j|$ denotes number of elements in subset $W_j$, n denotes a bit size of the accumulator register, k denotes a pre-defined bitdepth of input data and $b_j$ denotes a bias value.

12. The neural network according to claim 11, wherein $s_j$ of the second scaling factor for the j-th output channel of the at least one neural network layer is defined by:

$$s_j = \left\lfloor \log_2\left[\frac{2^{n-k} - 1 - \frac{|W_j|}{2} - \frac{|b_j|}{2^{k-1}}}{\sum_{w_i \in W_j}|w_i|}\right]\right\rfloor.$$

$$\lfloor x \rfloor = \text{floor}(x)$$

13. A method of operating a neural network comprising at least one neural network layer, the method comprising:
  implementing an approximation function of a mathematically defined real valued non-linear activation function as an activation function of the at least one neural network layer, wherein the approximation function allows for integer-only processing of fixed-point representations of input values of the approximation function, and wherein the activation function is connected to an output of the at least one neural network layer to provide an entropy model,
  wherein the approximation function comprises a finite Taylor series comprising a finite number of Taylor series summands which are determined based on expected values to be input into the at least one neural network layer or into the approximation function, and an accumulator register size of an accumulator register,
  wherein the neural network further comprises the accumulator register for buffering summation results; and
  wherein the method further comprises:
    reconstructing at least a portion of an image by processing a bitstream based on the provided entropy model to obtain a latent tensor representing a component of the image, and processing the latent tensor to obtain a tensor representing the component of the image, or transforming the tensor representing the component of the image into the latent tensor, and processing the latent tensor based on the provided entropy model to generate the bitstream.

14. A method of encoding data, comprising the steps of the method of operating the neural network according to claim 13 and outputting the bistream.

15. A method of decoding encoded data, comprising the steps of the method of operating the neural network according to claim 13 and outputting the reconstructed portion of the image.

16. A computer program product comprising a program code stored on a non-transitory medium, wherein the program, when executed on one or more processors, performs the method according to claim 13.

\* \* \* \* \*